US012639260B2

(12) United States Patent
Rogers et al.

(10) Patent No.: US 12,639,260 B2
(45) Date of Patent: May 26, 2026

(54) INTELLIGENT PROTECTION OF COMPUTING SNAPSHOTS

(71) Applicant: Rubrik, Inc., Palo Alto, CA (US)

(72) Inventors: Daniel Mark Rogers, Atherton, CA (US); Soham Mazumdar, San Francisco, CA (US); Michael Wronski, Johns Creek, GA (US); Inderpal Arora, Sunol, CA (US); Mudit Malpani, Sunnyvale, CA (US); Vasu Murthy, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/759,520

(22) Filed: Jun. 28, 2024

(65) Prior Publication Data

US 2024/0354287 A1     Oct. 24, 2024

Related U.S. Application Data

(63) Continuation of application No. 17/972,371, filed on Oct. 24, 2022, now Pat. No. 12,050,551.

(51) Int. Cl.
  *G06F 16/11*     (2019.01)
  *G06F 21/56*     (2013.01)
(52) U.S. Cl.
  CPC .......... *G06F 16/125* (2019.01); *G06F 16/128* (2019.01); *G06F 21/568* (2013.01)
(58) Field of Classification Search
  CPC ..... G06F 16/125; G06F 16/128; G06F 21/568
  USPC ........................................ 707/694
  See application file for complete search history.

(56) References Cited

U.S. PATENT DOCUMENTS

| | | | | |
|---|---|---|---|---|
| 7,117,322 B2 * | 10/2006 | Hochberg | ............. | G06F 16/122 |
| | | | | 707/999.203 |
| 7,600,086 B2 * | 10/2009 | Hochberg | ............. | G06F 16/185 |
| | | | | 711/134 |
| 7,680,830 B1 * | 3/2010 | Ohr | ........................ | G06F 16/125 |
| | | | | 707/999.2 |
| 7,930,315 B2 * | 4/2011 | Margolus | ............ | G06F 16/2358 |
| | | | | 707/783 |
| 10,397,236 B1 | 8/2019 | Chadha et al. | | |
| 10,652,025 B2 * | 5/2020 | Strong | .................... | G06F 21/51 |

(Continued)

FOREIGN PATENT DOCUMENTS

| | | |
|---|---|---|
| CN | 106506820 A | 3/2017 |
| CN | 109117308 A | 1/2019 |

(Continued)

*Primary Examiner* — Phuong Thao Cao
(74) *Attorney, Agent, or Firm* — Holland & Hart LLP

(57)     ABSTRACT

A data management system (DMS) may support intelligent snapshot protection techniques. For example, the DMS may backup a computing system and facilitate that capture and storage of snapshots of the computing system. The DMS may identify a deletion event associated with one or more of the snapshots, the deletion event being associated with the one or more snapshots being deleted at a first time. The DMS may determine that deletion event is anomalous and retain the one or more snapshots beyond the first time. For example, the DMS may determine that one or more parameters associated with the deletion event are indicative of the deletion event being anomalous. In response, the DMS may retain the one or more snapshots for a retention period beyond the first time.

17 Claims, 11 Drawing Sheets

(56) References Cited

U.S. PATENT DOCUMENTS

| | | | |
|---|---|---|---|
| 10,951,651 B1 | 3/2021 | Golan et al. | |
| 11,249,944 B2 * | 2/2022 | Savir | G06N 20/10 |
| 11,520,907 B1 * | 12/2022 | Borowiec | G06F 3/067 |
| 11,593,017 B1 | 2/2023 | Chang et al. | |
| 11,630,744 B2 * | 4/2023 | Bourgeois | H04L 63/145 |
| | | | 707/663 |
| 11,954,216 B1 * | 4/2024 | Markle | G06F 21/6218 |
| 2005/0055518 A1 | 3/2005 | Hochberg et al. | |
| 2006/0010177 A1 * | 1/2006 | Kodama | G06F 16/125 |
| 2008/0034003 A1 * | 2/2008 | Stakutis | G06F 16/125 |
| 2008/0307175 A1 * | 12/2008 | Hart | G06F 11/1458 |
| | | | 711/E12.103 |
| 2011/0185134 A1 | 7/2011 | Toews et al. | |
| 2016/0162364 A1 * | 6/2016 | Mutha | G06F 3/0608 |
| | | | 707/645 |
| 2017/0091256 A1 * | 3/2017 | Gordon | G06F 16/93 |
| 2017/0262157 A1 | 9/2017 | Shem et al. | |
| 2018/0276223 A1 * | 9/2018 | Dhanasekaran | G06F 16/125 |
| 2018/0276232 A1 * | 9/2018 | Dhanasekaran | G06F 16/25 |
| 2018/0293024 A1 | 10/2018 | Baptist et al. | |
| 2019/0013949 A1 | 1/2019 | Strong et al. | |
| 2019/0227878 A1 | 7/2019 | Agarwal et al. | |
| 2021/0117377 A1 | 4/2021 | Savir et al. | |
| 2021/0141698 A1 * | 5/2021 | Bourgeois | G06F 16/353 |
| 2021/0157504 A1 | 5/2021 | Hinman | |
| 2021/0224379 A1 * | 7/2021 | Pientka | G06F 11/1464 |
| 2021/0326217 A1 * | 10/2021 | Martin | G06F 3/067 |
| 2022/0027472 A1 | 1/2022 | Golden et al. | |
| 2022/0171681 A1 * | 6/2022 | Upadhyay | G06F 11/1464 |
| 2022/0318099 A1 | 10/2022 | Kotwal et al. | |
| 2022/0318118 A1 | 10/2022 | Adamson et al. | |
| 2023/0007023 A1 * | 1/2023 | Andrabi | H04L 63/1425 |
| 2023/0032714 A1 | 2/2023 | Pandit et al. | |
| 2023/0079486 A1 | 3/2023 | Yarlagadda et al. | |
| 2023/0103474 A1 | 4/2023 | Gunda et al. | |
| 2023/0131333 A1 | 4/2023 | Mccolgan et al. | |
| 2023/0176780 A1 | 6/2023 | Venugopal et al. | |
| 2023/0222092 A1 | 7/2023 | Xiang et al. | |
| 2023/0297541 A1 | 9/2023 | Boutell et al. | |

FOREIGN PATENT DOCUMENTS

| | | | | |
|---|---|---|---|---|
| CN | 113407994 A | | 9/2021 | |
| JP | 2002251304 A | * | 9/2002 | |
| WO | WO-2023077283 A1 | * | 5/2023 | G06F 16/16 |

* cited by examiner

Input Information

Output Information

735

740

Network Interface

Storage

715

730

Storage Manager

Memory

710

720

Processor

725

705

700

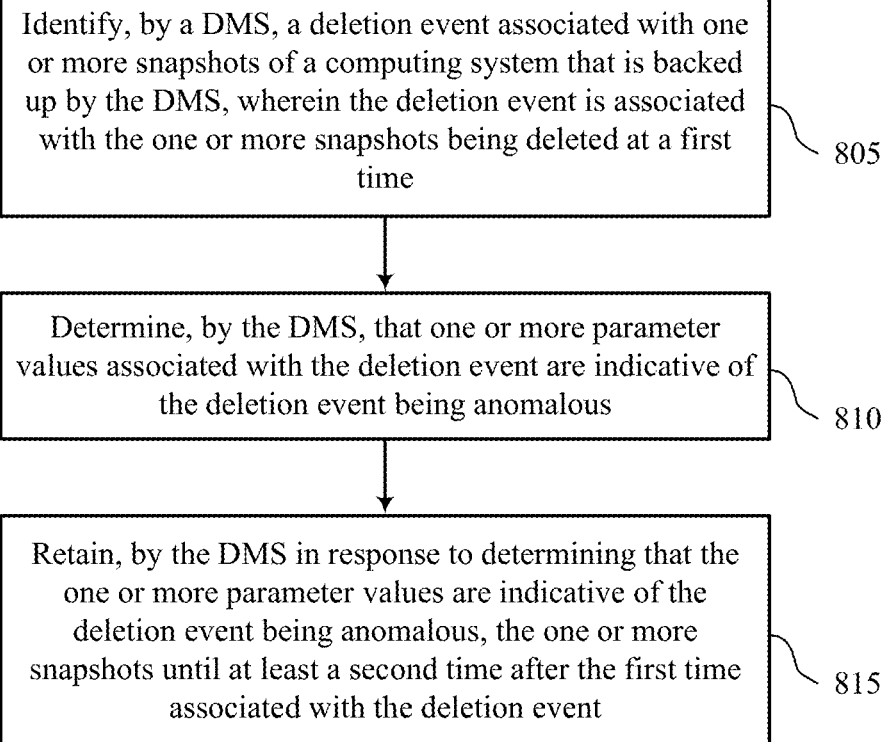

Identify, by a DMS, a deletion event associated with one or more snapshots of a computing system that is backed up by the DMS, wherein the deletion event is associated with the one or more snapshots being deleted at a first time

805

Determine, by the DMS, that one or more parameter values associated with the deletion event are indicative of the deletion event being anomalous

810

Retain, by the DMS in response to determining that the one or more parameter values are indicative of the deletion event being anomalous, the one or more snapshots until at least a second time after the first time associated with the deletion event

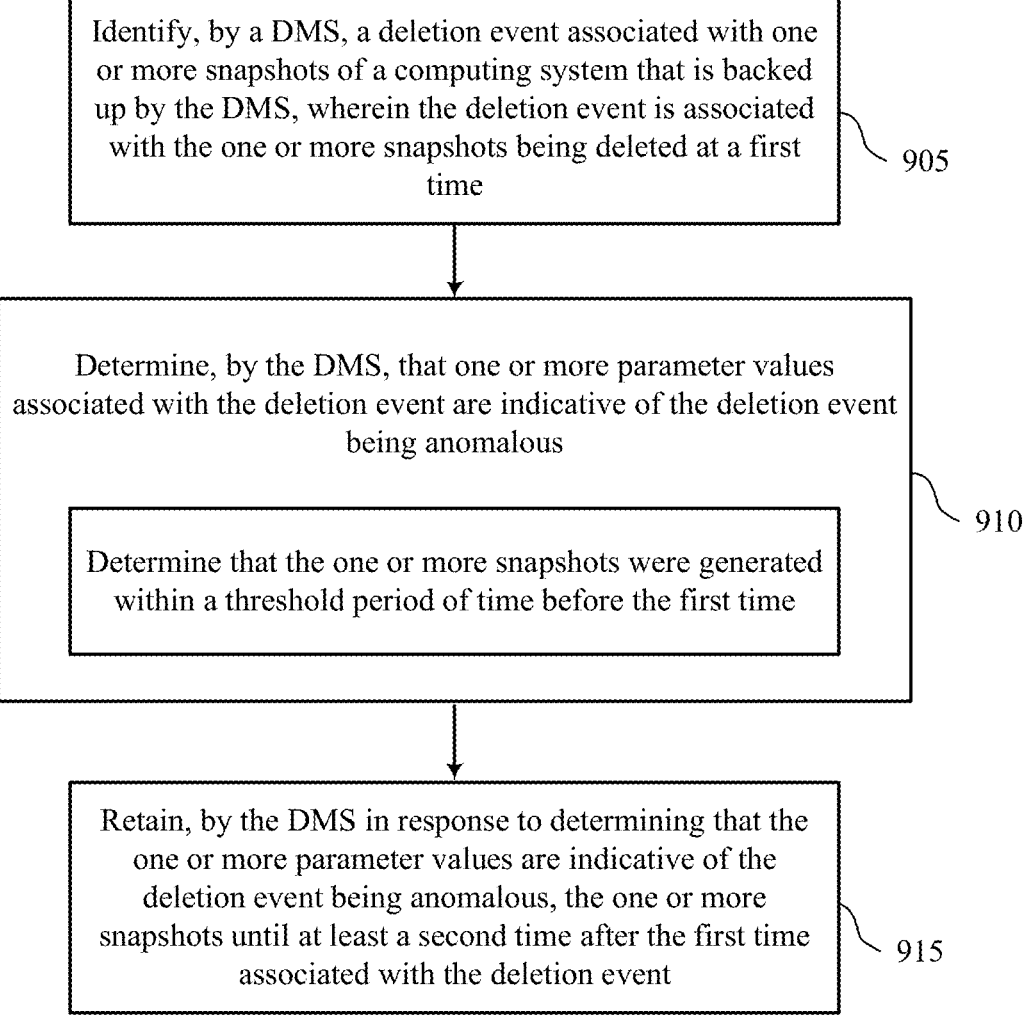

Identify, by a DMS, a deletion event associated with one or more snapshots of a computing system that is backed up by the DMS, wherein the deletion event is associated with the one or more snapshots being deleted at a first time

905

Determine, by the DMS, that one or more parameter values associated with the deletion event are indicative of the deletion event being anomalous Determine that the one or more snapshots were generated within a threshold period of time before the first time

910

Retain, by the DMS in response to determining that the one or more parameter values are indicative of the deletion event being anomalous, the one or more snapshots until at least a second time after the first time associated with the deletion event

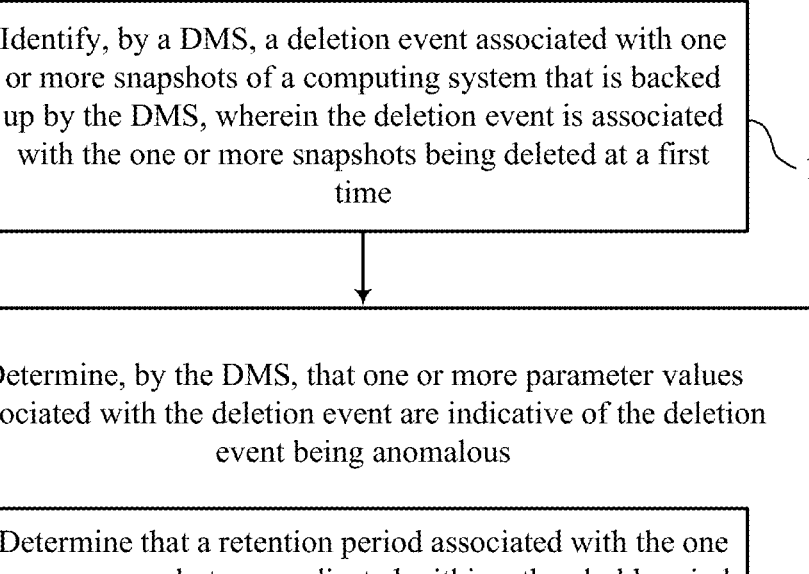

Identify, by a DMS, a deletion event associated with one or more snapshots of a computing system that is backed up by the DMS, wherein the deletion event is associated with the one or more snapshots being deleted at a first time

1005

Determine, by the DMS, that one or more parameter values associated with the deletion event are indicative of the deletion event being anomalous Determine that a retention period associated with the one or more snapshots was adjusted within a threshold period of time before the first time, the retention period corresponding to a time at which the one or more snapshots are eligible for deletion by the DMS

1010

Retain, by the DMS in response to determining that the one or more parameter values are indicative of the deletion event being anomalous, the one or more snapshots until at least a second time after the first time associated with the deletion event

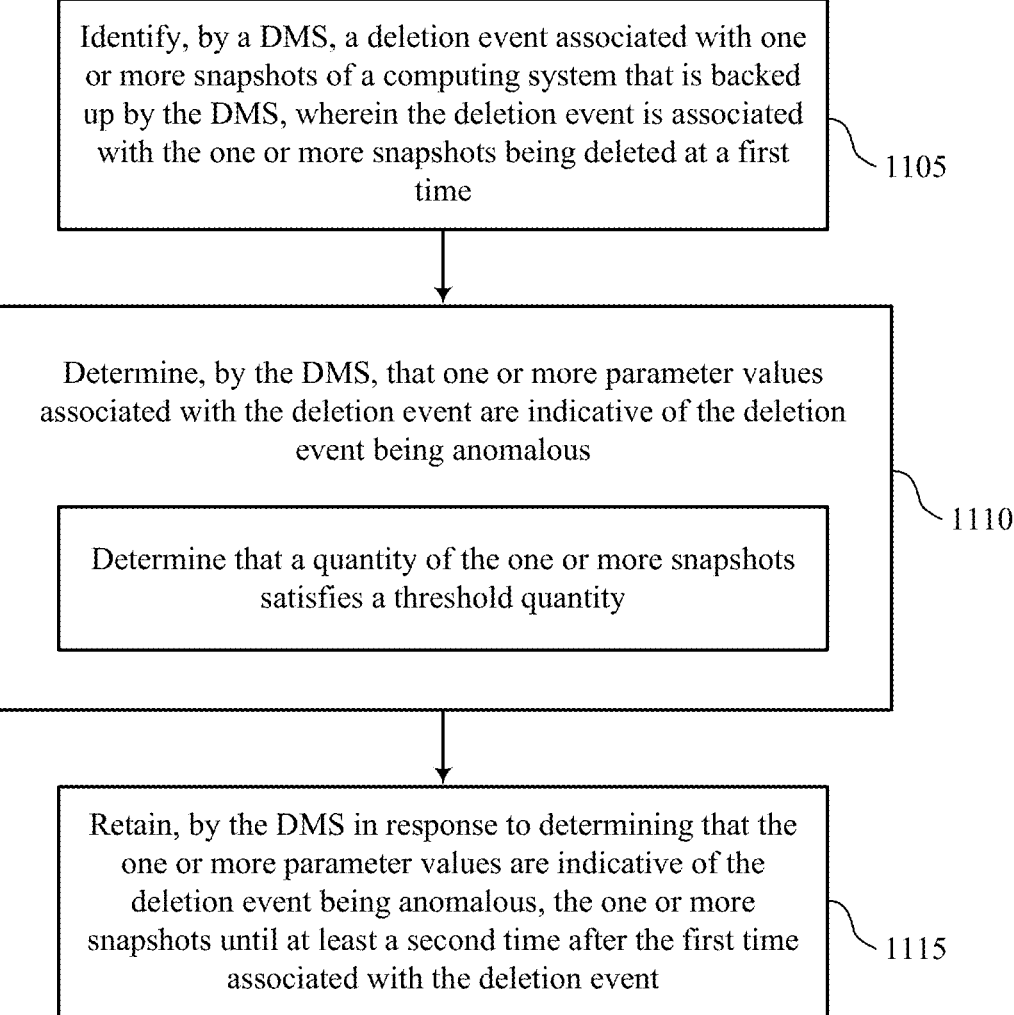

Identify, by a DMS, a deletion event associated with one or more snapshots of a computing system that is backed up by the DMS, wherein the deletion event is associated with the one or more snapshots being deleted at a first time

1105

Determine, by the DMS, that one or more parameter values associated with the deletion event are indicative of the deletion event being anomalous Determine that a quantity of the one or more snapshots satisfies a threshold quantity

1110

Retain, by the DMS in response to determining that the one or more parameter values are indicative of the deletion event being anomalous, the one or more snapshots until at least a second time after the first time associated with the deletion event

INTELLIGENT PROTECTION OF COMPUTING SNAPSHOTS

CROSS REFERENCE

The present application is a continuation of U.S. patent application Ser. No. 17/972,371, now U.S. Pat. No. 12,050, 551 by Rogers et al., entitled "INTELLIGENT PROTECTION OF COMPUTING SNAPSHOTS" and filed Oct. 24, 2022, which is assigned to the assignee hereof and is expressly incorporated by reference herein.

FIELD OF TECHNOLOGY

The present disclosure relates generally to data management, and more specifically to intelligent protection of computing snapshots.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 8 through 11 show flowcharts illustrating methods that support intelligent protection of computing snapshots in accordance with aspects of the present disclosure.

DETAILED DESCRIPTION

Figure 1:
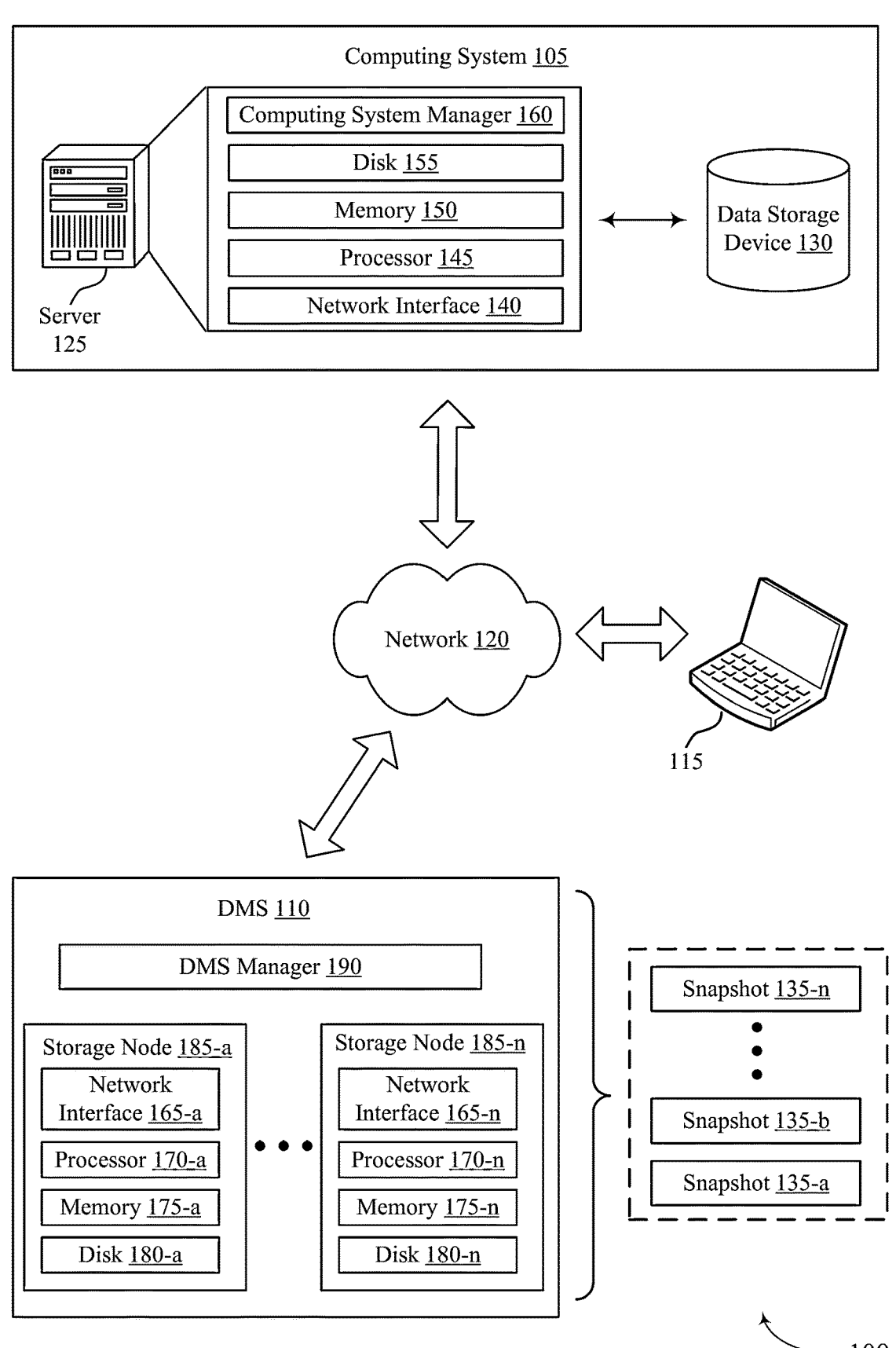
FIG. 1 illustrates an example of a computing environment that support intelligent protection of computing snapshots in accordance with aspects of the present disclosure.

A data management system (DMS) may provide backup and recovery services for data of a computing system. For example, the DMS may facilitate the capture (e.g., generation or ingestion) and storage of snapshots of the computing system (e.g., a computing object of the computing system such as a virtual machine, a database, a filesystem, a virtual disk, a virtual desktop, or other type of computing system or storage system), and the snapshots support later recovery (e.g., restoration) of the computing object. Such snapshots may be referred to herein as computing snapshots, or alternatively as snapshots. In some cases, snapshots may be undesirably deleted, for example, via user error or by a malicious actor. For instance, a malicious actor that has gained access to the DMS may cause one or more snapshots to undesirably expire (e.g., resulting in deletion of the snapshots by the DMS) via changes to a service level agreement (SLA) according to which snapshots are captured and stored, malware, or ransomware, among other possibilities. Additionally or alternatively, an intentional change to an SLA may be intentional (e.g., by an authorized user) but may nevertheless cause an unintentional deletion of one or more snapshots—for example, because the user may have been unaware or mistaken regarding whether the one or more snapshots would be deleted as a result of the SLA change. These are merely examples, and other situations in which snapshots are undesirably deleted by the DMS are possible.

As one example, snapshots may be protected from undesirable deletion by implementing a policy in which a snapshot marked for deletion (e.g., an expired snapshot) is retained for a configured duration beyond an intended deletion time (e.g., beyond expiration). However, retaining every snapshot beyond expiration may consume relatively large amounts of storage space, including by snapshots that may be deleted without loss of performance or other adverse impact. And if every snapshot is retained beyond expiration, the storage space used to store both non-expired snapshots and retained expired snapshots may increase costs associated with backup and recovery services, for example, by increasing the amount of storage space required to support the services. Thus, more intelligent snapshot protection that balances robust snapshot protection with the storage space occupied by snapshots retained beyond expiration is desirable.

In accordance with other examples as described herein, a DMS may implement a heuristic analysis to intelligently determine whether to delete or retain a snapshot associated with a deletion invent. For example, the deletion event may be associated with a first time at which the snapshot is to be deleted by the DMS (e.g., based on an expiration of the snapshot at or before the first time). Using the heuristic analysis, the DMS may determine whether the deletion event is anomalous (e.g., suspicious, or potentially unintentional). That is, the DMS may determine whether the deletion of the snapshot is potentially unintentional, the result of an attack by a malicious actor, or some other cause resulting in the unwanted deletion of the snapshot. For example, the DMS may determine that one or more parameters associated with the deletion event, such as the snapshot having been recently generated or a retention period of the snapshot having been recently changed, among others described herein, are indicative of the deletion event being anomalous (e.g., suspicious). A single parameter may be indicative of the deletion event being anomalous, or a combination of parameters may be indicative of the deletion event being anomalous. If the DMS determines that a deletion event is anomalous, the DMS may determine that an associated snapshot qualifies for extended protection and may retain the snapshot beyond the first time (e.g., beyond a time at which the snapshot would have otherwise been deleted, but for the extended protection). If, however, the DMS determines that the deletion event is non-anomalous (e.g., unsuspicious), the DMS may delete the associated snapshot at the first time.

By implementing heuristic-based snapshot protection techniques such as those described herein, the DMS may balance robust snapshot protection, storage capacity, and storage costs, among other possible considerations. For example, selectively retaining snapshots whose deletion appears to be anomalous may reduce the likelihood that snapshots are undesirably deleted, while selectively deleting snapshot whose deletion appears to be non-anomalous may reduce costs associated with supporting retention of snapshots beyond expiration (e.g., reduce a quantity of snapshots retained beyond expiration, thereby reducing storage space occupied by such snapshots). Thus, the DMS may provide protection against unwanted snapshot deletion while avoiding undue impact to backup capacity requirements and costs.

These and additional aspects of the present disclosure are further described below. Aspects of the disclosure are initially described in the context of computing environments. Aspects of the disclosure are additionally described in the context of a process flow. Aspects of the disclosure are further illustrated by and described with reference to apparatus diagrams, system diagrams, and flowcharts that relate to intelligent protection of computing snapshots.

FIG. 1 illustrates an example of a computing environment 100 that supports intelligent protection of computing snapshots in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely impacting other aspects of the performance of the computing system 105.

In some examples, the DMS 110 may store a snapshot 135 in accordance with a retention policy. For example, the retention policy may indicate an expiration of the snapshot 135 at which time the DMS 110 may be configured to delete the snapshot 135, for example, to free storage space for the storage of other snapshots 135. In some examples, snapshots 135 may be undesirably deleted, for example, via user error or by a malicious actor. For instance, a malicious actor that has gained access to the DMS 110 may cause the snapshot 135 to undesirably expire, for example, via a change to the retention policy. In some cases, snapshots 135 may be protected from unwanted deletion by implementing policies to retain every snapshot 135 for some duration beyond expiration of the snapshot 135. However, such policies may result in the storage of many snapshots 135 whose deletion is desired and may thus unnecessarily occupy storage space which may be used for other purposes. In some cases, storage of such snapshots 135 may necessitate increased storage capacity, thereby increasing costs associated with storing the snapshots 135.

In accordance with examples described herein, the DMS 110 may implement heuristic-based techniques to selectively determine which snapshots 135 to retain beyond expiration and which snapshots 135 to delete in response to expiration. For example, the DMS 110 may determine whether a deletion event associated with a snapshot 135 appears to be anomalous. For instance, if one or more parameters associated with the deletion event are indicative of the deletion event being anomalous, the DMS 110 may retain the snapshot 135 beyond a time associated with the deletion event (e.g., beyond an expiration of the snapshot 135), thereby protecting the snapshot 135 from a potentially unwanted deletion. Alternatively, if the deletion event appears to be non-anomalous, the DMS 110 may delete the snapshot 135, thereby freeing storage space occupied by the snapshot 135 for other purposes.

Figure 2:
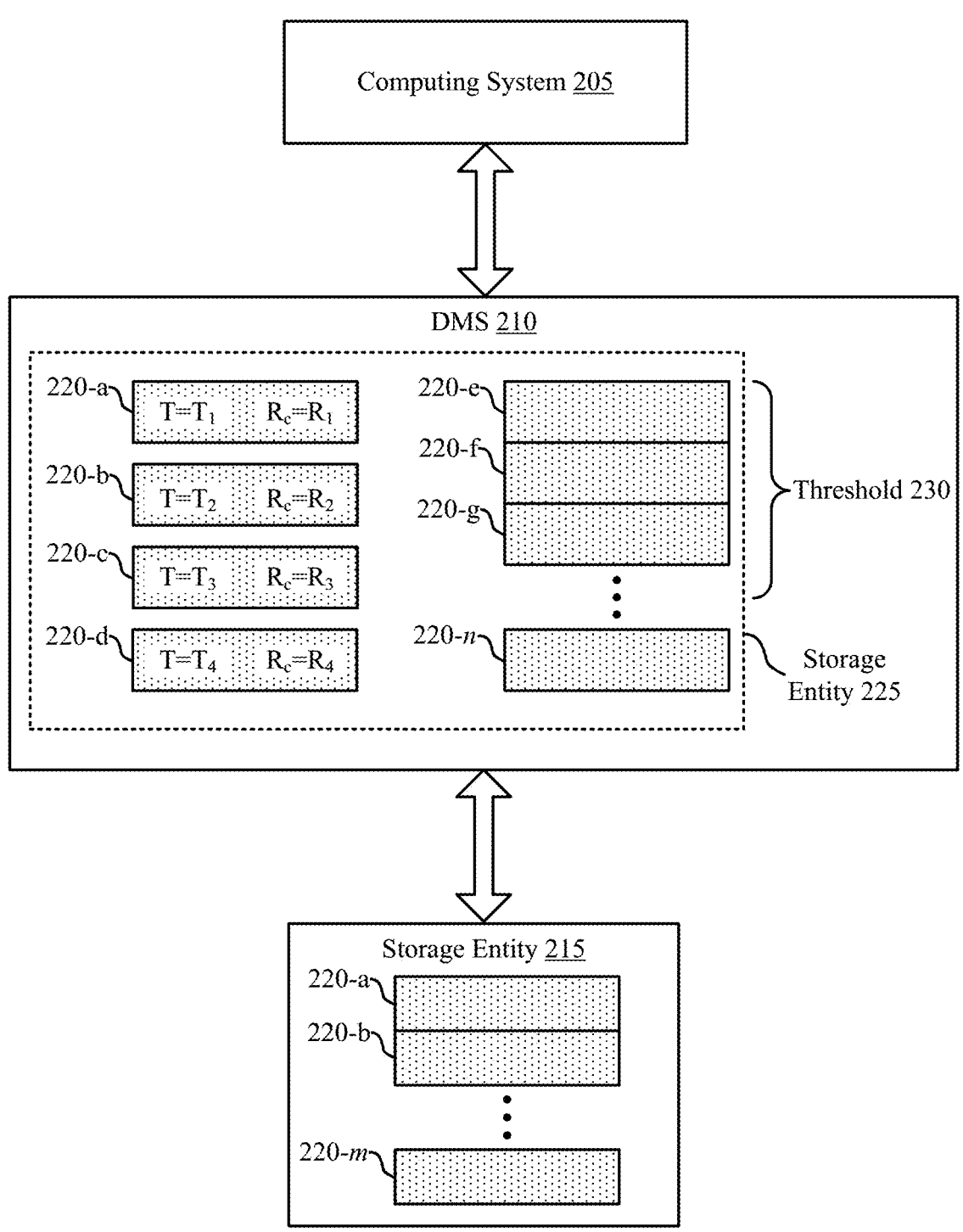
FIG. 2 illustrates an example of a computing environment that supports intelligent protection of computing snapshots in accordance with aspects of the present disclosure.

FIG. 2 illustrates an example of a computing environment 200 that supports intelligent protection of computing snapshots in accordance with aspects of the present disclosure. The computing environment 200 may implement or be implemented by aspects of the computing environment 100 described with reference to FIG. 1. For example, the computing environment 200 may include a computing system 205 and a DMS 210, which may be examples of the systems described herein, including with reference to FIG. 1.

The computing environment 200 may support communications between the computing system 205 and the DMS 210. For example, the computing system 205 and the DMS 210 may communicate via a network, such as a network 120 described with reference to FIG. 1. In some examples, the computing environment 200 may also include one or more storage entities 215. A storage entity 215 may be an example of a cloud environment, a data center, or some other storage entity (e.g., data storage device 130) that may communicate with the DMS 210 (e.g., via the network 120).

The DMS 210 may support the generation (e.g., capture, extraction) and storage of snapshots 220 as described herein, including with reference to FIG. 1. The snapshots 220 may be examples of a snapshot 135 described with reference to FIG. 1. For example, the snapshots 220 may be respective point-in-time snapshots of one or more computing objects of the computing system 205. The DMS 210 may store or otherwise access the snapshots 220, such that the snapshots 220 may be used by the DMS 210 to the restore a target version of a corresponding computing object. In some examples, the DMS 210 may store the snapshots 220 in one or more storage entities 225, which may be examples of a storage node 185 described with reference to FIG. 1. In some examples, a storage entity 225 may be an example of a cloud environment.

The DMS 210 may manage the generation and storage of snapshots 220 in accordance with a backup policy (e.g., a backup configuration). For example, the backup policy may indicate the frequency at which the DMS 210 is to obtain a snapshot 220 (e.g., transmit a snapshot request to the computing system 105, cause the generation of a snapshot 220), such as one or more times every hour, day, two days, week, month, and the like. The DMS 210 may also manage the storage and deletion of snapshots 220 in accordance with a retention policy (e.g., retention configuration). For example, the retention policy may indicate for what duration the DMS 210 is to store a snapshot 220 after it is obtained by the DMS 210, which may be referred to as a retention period. That is, the retention period may correspond to a time at which a snapshot 220 is eligible for deletion by the DMS 210 (e.g., the time at which the snapshot 220 expires). For instance, if the retention policy indicates a retention period of 10 days, the DMS 210 may be configured to store the snapshot 220 for 10 days after it is obtained (e.g., generated). Once the snapshot 220 has been stored for the retention period, the snapshot 220 may be considered expired, and the DMS 210 may be configured to delete the snapshot 220, for example, to free storage space of the storage entity 225 occupied by the snapshot 220 for other purposes (e.g., storage of other snapshots 220).

In some examples, one or more of the backup policy and the retention policy may be configured as part of an SLA between the DMS 210 (e.g., an operator of the DMS 210) and the computing system 205 (e.g., a user of the computing system 205). In some examples, one or more of the backup policy and the retention policy may be changed over time. For example, changes to the SLA may include changes to one or more of the frequency at which the DMS 210 obtains snapshots 220 and the duration that the DMS 210 stores the snapshots 220 after obtainment.

In some cases, the DMS 210 may undesirably delete one or more snapshots 220, for example, as a result of user error or an attack by a malicious actor. In an example, the DMS 210 may be configured to store snapshots 220 for 7 days in accordance with a retention policy. A malicious actor may gain access to the DMS 210 or the computing system 205 and change the retention policy such that the DMS 210 may be configured to store snapshots, for example, for 1 day. As a result, the snapshots 220 which the DMS 210 has stored for more than 1 day and up to 7 days may now be expired and may thus be deleted by the DMS 210. Accordingly, the change to the retention policy by the malicious actor may cause unwanted expiration and deletion of one or more snapshots 220. Additionally or alternatively, the change to the retention policy may be the result of user error, or the user may be unaware of the effects of the retention policy change (e.g., that the retention policy change may cause the expiration and deletion of the one or more snapshots 220). Other examples of undesirable snapshot deletion are possible, such as forced deletions of the one or more snapshots 220 (e.g., before expiration of the one or more snapshots 220), among others.

The DMS 210 may protect snapshots 220 from undesirable deletion that may result from user error or a malicious actor attack. For example, the DMS 210 may be configured to retain (e.g., continue to store) a snapshot 220 beyond an expiration of the snapshot 220 (e.g., or refrain from performing a forced deletion of the snapshot 220). Additionally, the DMS 210 may intelligently select which snapshots 220 to retain beyond expiration and which snapshots 220 to delete in order to consider the robustness of snapshot protection, storage capacity of the storage entity 225 allocated for storing the snapshots 220, storage costs to a user of the computing system 205, or a combination thereof. For example, the storage of snapshots 220 beyond expiration may consume storage space of the storage entity 225 that may otherwise be used for other purposes. Storing every snapshot 220 beyond a corresponding expiration, for example, may consume a relatively large quantity of the storage space, which may reduce storage space available for other purposes or necessitate the purchase of additional storage space, thereby increasing costs for the user of the computing system 205. But storing no or relatively few snapshots 220 beyond expiration may result in the undesirable deletion of some snapshots 220.

The DMS 210 may perform a heuristic-based analysis to determine whether to retain or delete an expired snapshot 220 in order to balance snapshot protection robustness, storage capacity, storage costs, and the like, in protecting snapshots 220 from unwanted deletion. For example, the DMS 210 may identify a deletion event associated with one or more snapshots 220, where the deletion event may correspond to the one or more snapshots 220 being deleted at a first time. The DMS 210 may use heuristics to determine whether the one or more snapshots qualify for protection (e.g., retention beyond expiration). For example, the DMS 210 may determine whether one or more parameters associated with the deletion event are indicative of the deletion event being anomalous. For instance, the one or more parameters may indicate whether the deletion of the one or more snapshots is potentially unwanted (e.g., suspicious, the result of user error or an attack by a malicious actor).

Accordingly, if the one or more parameters are indicative of the deletion event being anomalous, the DMS 210 may retain the one or more snapshots 220 beyond the first time. For example, the DMS 210 may retain the one or more snapshots 220 for a retention duration beyond the first time (e.g., after the one or more snapshots have expired) and may delete the one or more snapshots 220 after the retention duration. For instance, the DMS 210 may retain the one or more snapshots 220 until at least a second time after the first time in accordance with the retention duration (e.g., the time difference between the first time and the second time may be the retention duration). Alternatively, if the one or more parameters are indicative of the deletion event being non-anomalous, the DMS 210 may delete the one or more snapshots 220 in accordance with the deletion event (e.g., at the first time).

Various parameters may be used to determine whether a deletion event is anomalous. For example, to determine whether the deletion event is anomalous, the DMS 210 may determine whether a snapshot 220 was generated within a threshold period of time before the first time. The snapshot 220 being generated within the threshold period of time may be indicative of the deletion event being anomalous, while the snapshot 220 being generated outside of the threshold period of time may be indicative of the deletion event being non-anomalous. This may be because the data captured in newer snapshots 220 may be updated relative to data captured in older snapshots 220 and may thus be more valuable to store in case of recovery. Accordingly, deletion of newer snapshots 220 may be relatively more suspicious (e.g., indicative that the deletion is undesirable) than the deletion of older snapshots 220. In an example, if an age of the snapshot 220 at (e.g., by) the first time is less than a threshold, deletion of the snapshot 220 may be considered anomalous. For example, if the snapshot 220 is less than "M" days (e.g., minutes, hours, weeks, months, and the like) old at the first time (e.g., the snapshot 220 was generated less than M days ago), the DMS 210 may determine that the deletion of the snapshot 220 (e.g., the deletion event) is anomalous, where M may be some positive value. In response to the determination that the deletion event is anomalous, the DMS 210 may retain the snapshot 220 beyond the first time (e.g., for the retention duration). However, if the snapshot 220 is greater than, for example, M days old, the DMS 210 may determine that the deletion event is non-anomalous and may delete the snapshot 220 at the first time.

Additionally or alternatively, to determine whether the deletion event is anomalous, the DMS 210 may determine whether a retention period (e.g., a retention policy) associated with the snapshot 220 was adjusted (e.g., changed, modified, updated) within a threshold period of time before the first time. The retention period being adjusted within the threshold period of time may be indicative of the deletion event being anomalous, while the retention period being adjusted outside of the threshold period of time may be indicative of the deletion event being non-anomalous. This may be because adjustments to the retention period may adjust the expirations of snapshots 220 stored by the DMS 210. If the retention period was adjusted a relatively longer period of time before the deletion event, then the DMS 210 may have been managing snapshot storage and deletion according to the retention period for the longer period of time. Accordingly, deletion of the snapshot 220 in accordance with the retention period may be considered usual (e.g., typical, business-as-usual). However, if the retention period was recently changed, then it may be unknown whether deletion of the snapshot 220 in accordance with the new retention period is intentional or unintentional (e.g., unwanted, malicious). That is, it may be unknown whether the change to the retention period resulting in the expiration of snapshot 220 was intentional or unintentional.

In an example, if the retention period of the snapshot 220 was adjusted less than a threshold amount of time ago (e.g., before the first time), deletion of the snapshot 220 may be considered anomalous. For example, if, at the first time, the retention period of the snapshot 220 was adjusted less than "N" days (e.g., minutes, hours, weeks, months, and the like) ago, the DMS 210 may determine that the deletion of the snapshot 220 (e.g., the deletion event) is anomalous, where N may be some positive value. In response to the determination that the deletion event is anomalous, the DMS 210 may retain the snapshot 220 beyond the first time (e.g., for the retention duration). However, if, at the first time, the retention period of the snapshot 220 was adjusted more than, for example, N days ago, the DMS 210 may determine that the deletion event is non-anomalous and may delete the snapshot 220 at the first time.

In some examples, the DMS 210 may determine that the retention period was adjusted based on an adjustment to an SLA that includes a configuration of the retention period. For example, the adjustment to the retention period may result from (e.g., correspond to) the adjustment to the SLA. Accordingly, the DMS 210 may determine that the retention period was adjusted within the threshold period of time based on determining that the SLA was adjusted within the threshold period of time.

In some examples, the DMS 210 may determine whether the deletion event is anomalous based on a combination of the age of the snapshot 220 and the recency of adjustment to the retention period. For example, the DMS 210 may determine that the deletion event is anomalous if both (a) the snapshot 220 was generated within a first threshold period of time before the first time and (b) the retention period was adjusted within a second threshold period of time before the first time (e.g., which may be the same as or different than the first threshold period of time). Thus, in some examples, if a snapshot was created less than M days ago and there was a change in an associated retention policy less than N days ago, the snapshot may be retained for some period beyond when the snapshot would otherwise have been deleted, and otherwise the DMS 210 may determine that the deletion event is non-anomalous. Alternatively, the DMS 210 may determine that the deletion event is anomalous if the either (a) the snapshot 220 was generated within the first threshold period of time or (b) the retention period was adjusted within the second threshold period of time. Thus, in some examples, the snapshot may be retained for some period beyond when the snapshot would otherwise have been deleted if either the snapshot was created less than M days ago or there was a change in an associated retention policy less than N days ago.

In the example of FIG. 2, the DMS 210 may store snapshots 220-*a*, 220-*b*, 220-*c*, and 220-*d*. The snapshot 220-*a* may have been generated at a time $T=T_1$, the snapshot 220-*b* may have been generated at a time $T=T_2$, snapshot 220-*c* may have been generated at a time $T=T_3$, and the snapshot 220-*d* may have been generated at a time $T=T_4$. Additionally, the retention period of the snapshot 220-*a* may have been changed at a time $R_c=R_1$, the retention period of the snapshot 220-*b* may have been changed at a time $R_c=R_2$, the retention period of the snapshot 220-*c* may have been changed at a time $R_c=R_3$, and the retention period of the snapshot 220-*a* may have been changed at a time $R_c=R_4$. The DMS 210 may identify one or more deletion events associated with the deletion of the snapshots 220-*a*, 220-*b*, 220-*c*, and 220-*d* at a first time. In the example of FIG. 2, times $T_1$ and $T_3$ may be within a first threshold period of time before the first time, and times $T_2$ and $T_4$ may be outside of the first threshold period of time. Additionally, times $R_2$ and $R_3$ may be within a second threshold period of time before the second time, and times $R_1$ and $R_4$ may be outside of the second threshold period of time.

If the DMS 210 is configured to determine whether the deletion of the snapshots 220-*a* through 220-*d* is anomalous based on both the time at which the snapshots 220 were generated and the time at which the retention periods were adjusted, the DMS 210 may determine that the deletion of the snapshot 220-*c* is anomalous based on $T_3$ and $R_3$ both being within the corresponding threshold periods of time. Additionally, the DMS 210 may determine that deletion of the snapshots 220-*a*, 220-*b*, and 220-*d* is non-anomalous based on at least one of the respective times T or R being outside of the corresponding threshold periods of time (e.g., $R_1$ is outside of the second threshold period of time, $T_2$ is outside of the first threshold period of time, $T_4$ and $R_4$ are outside of the first and second threshold periods of time, respectively). Accordingly, the DMS 210 may retain the snapshot 220-*c* beyond the first time and delete the snapshots 220-*a*, 220-*b*, and 220-*d* at the first time.

If the DMS 210 is configured to determine whether the deletion of snapshots 220-*a* through 220-*d* is anomalous based on either the time at which the snapshots 220 were generated or the time the retention periods were adjusted, the DMS 210 may similarly determine that deletion of the snapshots 220-*a*, 220-*b*, and 220-*c* is anomalous while the deletion of the snapshot 220-*d* is non-anomalous. Accordingly, the DMS 210 may retain the snapshots 220-*a*, 220-*b*, and 220-*c* beyond the first time and delete the snapshot 220-*d* at the first time.

In some examples, to determine whether a deletion event is anomalous, the DMS 210 may determine whether a quantity of snapshots 220 to be deleted as part of the deletion event satisfies (e.g., is greater than, is greater than or equal to) a threshold 230. Deleting a quantity of snapshots 220 that satisfies the threshold 230 may be indicative of the deletion event being anomalous, while deleting a quantity of snapshots 220 that fails the satisfy (e.g., is less than, is less than or equal to) the threshold 230 may be indicative of the deletion event being non-anomalous. This may be because deleting a relatively large quantity of snapshots 220 may be indicative of, for example, a mass deletion event instigated by a malicious actor. Accordingly, deletion of the large quantity of snapshots 220 may likely be unwanted, for example, by the user of the computing system 205. In the example of FIG. 2, the DMS 210 may identify a deletion event that is associated with deleting snapshots 220-*c*, 220-*f*, 220-*g*, up through 220-*n* stored by the DMS 210 at a first time. The DMS 210 may determine that the quantity of snapshots 220 associated with the deletion event satisfies threshold 230 and may thus determine that the deletion event is anomalous. In response, the DMS 210 may retain the snapshots 220-*e* through 220-*n* beyond the first time (e.g., until at least a second time in accordance with a retention duration).

In some examples, the DMS 210 may determine whether a deletion event is anomalous based on a combination parameters associated with the deletion event, such as a combination of any one or more of the time at which snapshots 220 were generated, the time at which associated retention periods were adjusted, the quantity of snapshots 220 associated with the deletion event, or one or more other parameters. For example, the DMS 210 may determine that a deletion event is anomalous if any one evaluated parameter is satisfied, if a subset of evaluated parameters is satisfied, or if each evaluated parameter is satisfied.

In some examples, the thresholds used to determine whether a deletion event is anomalous (e.g., the first threshold period of time, the second threshold period of time, the threshold 230) may be configured based on a storage capacity available for (e.g., allocated to) storing the snapshots 220. For example, the storage entity 225 may have a limited storage capacity allocated to storing snapshots 220. Values of the thresholds used may affect the quantity of snapshots 220 that are retained beyond expiration. For example, greater values of the first and second threshold periods of time and a smaller value of the threshold 230 may result in greater quantities of snapshots 220 qualifying for protection and thus being retained beyond expiration. Accordingly, the thresholds may be adjusted based on the allocated storage capacity of the storage entity 225. For example, if the storage capacity is relatively limited, the thresholds may be configured (e.g., adjusted) such that fewer snapshots 220 are retained beyond expiration. Alternatively, if the allocated storage capacity is relatively large, the thresholds may be configured such that a greater quantity of snapshots 220 are retained beyond expiration (e.g., to further increase snapshot protection).

In some examples, the thresholds may be based on a subscription associated with the computing system 205 to a snapshot protection service. For example, the snapshot protection service may correspond to the selective retention of snapshots 220 beyond expiration as described herein. Different tiers of the subscription may correspond to different levels of protection. For example, a first tier may be associated with a greater level of protection than a second tier, and the thresholds configured in accordance with the first tier may correspond to greater quantities of snapshots 220 being retained beyond expiration than the thresholds configured in accordance with the second tier. In some examples, the subscription (e.g., the tier of the subscription) may be configured (e.g., selected) as part of the SLA.

The duration for which the DMS 210 retains snapshots 220 beyond a time associated with a deletion event (e.g., the retention duration) may be based on various factors. For example, the storage capacity of the storage entity 225 allocated to storing snapshots 220. For instance, the greater the storage capacity allocated to storing snapshots 220, the greater the retention duration may be, and vice versa. In this way, an effect of the retention of the snapshots 220 beyond expiration on the storage space of the storage entity 225 available for other purposes besides snapshot retention may be tuned in accordance with the allocated storage capacity.

Additionally or alternatively, the retention duration may be based on a tier of the subscription of the computing system 205 to the snapshot protection service provided by the DMS 210. For example, a first tier of the subscription may correspond to a longer retention duration than a second tier of the subscription. In some examples, the tier of the subscription associated with the retention duration may be selected independent of storage capacity considerations. For example, even if the storage capacity is relatively limited, the first tier corresponding to a relatively longer retention duration may be selected, and the DMS 210 may retain the snapshots 220 beyond expiration in accordance with the selected first tier. Alternatively, even if the allocated storage capacity is relatively large, the second tier corresponding to a relatively shorter retention duration may be selected, and the DMS 210 may retain the snapshots 220 beyond expiration in accordance with the selected second tier. In some examples, tier selection may be limited based on the allocated storage capacity. For example, one or more tiers corresponding to relatively longer retention durations may be excluded from a list of selectable tiers if the allocated storage capacity is relatively limited, for instance, to avoid excessive consumption of the available storage capacity by snapshots 220 retained beyond expiration. In some examples, the subscription (e.g., the tier of the subscription) may be configured (e.g., selected) as part of the SLA.

In some examples, the heuristic-based retention of snapshots 220 may be an "always-on" operation performed by the DMS 210. For example, the retention of snapshots 220 beyond expiration (e.g., until at least the second time) in response to determining that a deletion event is anomalous may be an immutable (e.g., unchangeable) configuration of the DMS 210. That is, no customer configuration (e.g., SLA) or ability to disable such retention (e.g., even temporarily) may be available to the user of the computing system or an operator of the DMS 210. In this way, protection of snapshots 220 from unwanted deletion by a malicious actor (e.g., or via user error) may be further increased, for example, as the malicious actor may be unable to disable such snapshot retention even if it were to gain access to the computing system 205 or the DMS 210.

In some examples, the DMS 210 may offload one or more snapshots 220 retained beyond expiration to the storage entity 215 (e.g., the snapshot 220-*a* through a snapshot 220-*m*). For example, the DMS 210 may store the one or more snapshots 220 in the storage entity 225 prior to retention (e.g., prior to a first time associated with a deletion event to delete the one or more snapshots 220). In some examples, the DMS 210 may store the one or more snapshots 220 in the storage entity 225 for the retention duration, and after the retention duration, the DMS 210 may transfer the one or more snapshots 220 from the storage entity 225 to the storage entity 215 for storage. That is, after the retention duration, the DMS 210 may store the one or more snapshots 220 to the storage entity 215 and delete the one or more snapshots 220 from the storage entity 225. In some other examples, the DMS 210 may retain the one or more snapshots 220 at the storage entity 215. That is, after the first time (e.g., at the first time), the DMS 210 may transfer the one or more snapshots 220 to the storage entity 215 to be retained for the retention duration and may delete the one or more snapshots 220 from the storage entity 225 to free up the corresponding storage space. In some examples, copies of the one or more snapshots 220 may be stored to the storage entity 215 in addition to the one or more snapshots 220 being retained at the storage entity 225.

By offloading the one or more snapshots 220 to the storage entity 215, storage space at the storage entity 225 may be made available for other purposes. In some examples, the storage entity 215 may be associated with a greater access latency than the storage entity 225. That is, reading data from and/or writing data to the storage entity 215 may be slower than reading data from and/or writing data to the storage entity 225. As such, storage space at the storage entity 215 may be relatively cheaper than storage space at the storage entity 225. Accordingly, retention of the snapshots 220 beyond expiration, including beyond the retention duration, may be achieved with reduced effect on the storage availability at the storage entity 225, cost to the user of the computing system, or both.

In some examples, storing the one or more snapshots 220 to the storage entity 215 may be based on a subscription of the computing system 205 to the snapshot protection service provided by the DMS 210. For example, a first tier of the subscription may correspond to retention of the snapshots 220 at storage entity 225 without transfer of the snapshots 220 to the storage entity 215. A second tier of the subscription may correspond to retention of the snapshots 220 at the storage entity 215 (e.g., instead of or in addition to storage at the storage entity 225). A third tier of the subscription may correspond to retention of the snapshots 220 at the storage entity 215 following an expiration of the retention duration, such that the snapshots 220 may continue to be retained (e.g., for a second retention duration) while freeing space at the storage entity 225. Other tiers are possible, including various retention durations at the storage entity 215 and the storage entity 225, among other possibilities. In some examples, the subscription (e.g., the tier of the subscription) may be configured (e.g., selected) as part of the SLA.

In some examples, the DMS 210 may generate (e.g., modify, update) metadata associated with a snapshot 220 that is retained by the DMS 210 beyond expiration. For example, in response to retaining a snapshot 220 beyond expiration, the DMS 210 may modify metadata corresponding to the snapshot 220 to indicate (e.g., include an indication) that the snapshot 220 has been retained. For instance, the DMS 210 may modify or add a RetainedByIDL flag in the metadata to indicate that the snapshot 220 has been retained. Such metadata modification may enable the DMS 210 to track which snapshots 220 have been retained beyond expiration.

Figure 3:
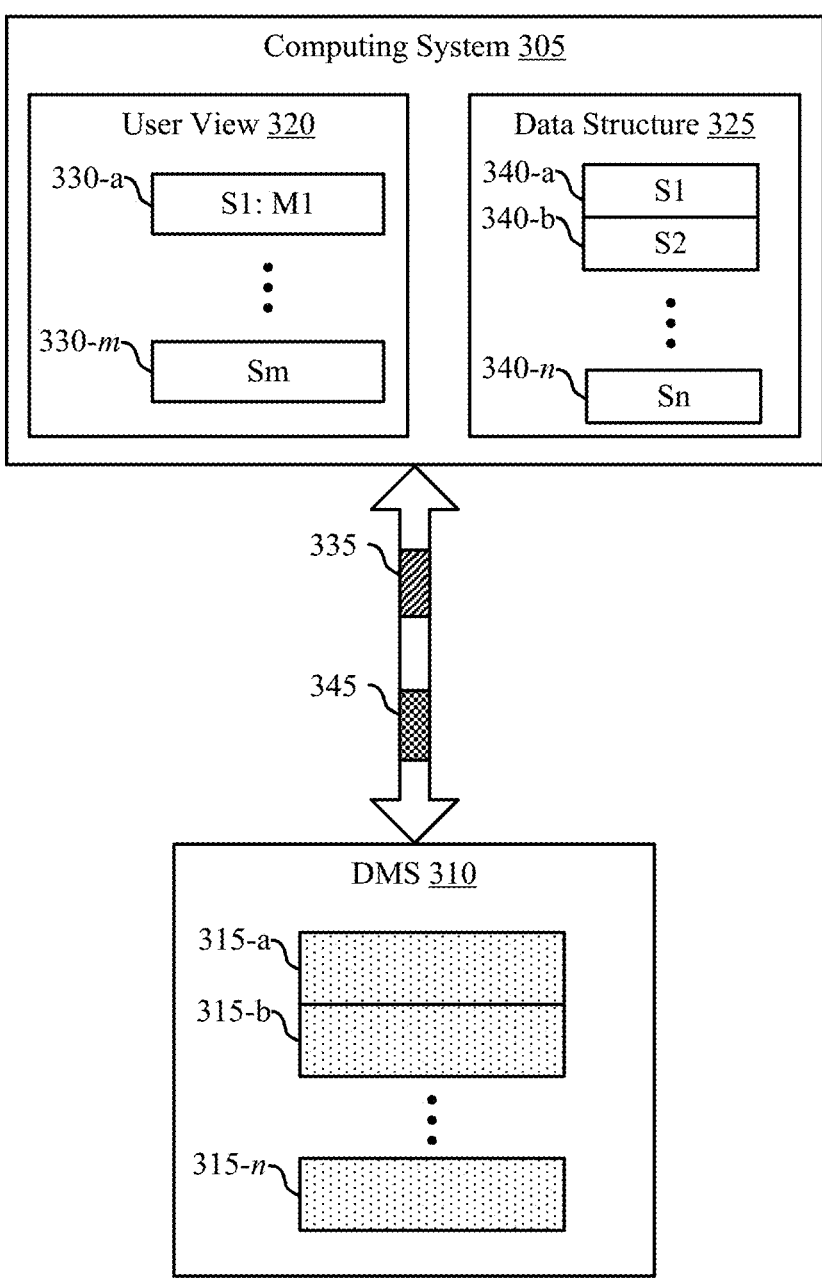
FIG. 3 illustrates an example of a computing environment that supports intelligent protection of computing snapshots in accordance with aspects of the present disclosure.

FIG. 3 illustrates an example of a computing environment 300 that supports intelligent protection of computing snapshots in accordance with aspects of the present disclosure. The computing environment 300 may implement or be implemented by aspects of the computing environments 100 and 200 described with reference to FIGS. 1 and 2, respectively. For example, the computing environment 300 may include a computing system 305 and a DMS 310, which may be examples of the systems described herein, including with reference to FIGS. 1 and 2.

The DMS 310 may manage the generation, storage, and retention of snapshots 315, which may be examples of a snapshot 135 or a snapshot 220 described with reference to FIGS. 1 and 2, respectively. For example, the snapshots 315 may be point-in-time snapshots of one or more computing objects of the computing system 305. In the example of FIG. 3, the DMS 310 may store a quantity of snapshots 315, such as a snapshot 315-*a*, a snapshot 315-*b*, up through a snapshot 315-*n*. The DMS 310 may retain one or more of the snapshots 315 beyond expiration as described herein, including with reference to FIG. 2, based on determining that one or more associated deletion events are anomalous.

The DMS 310 may support notifying the computing system 305 of the retention of the one or more snapshots 315. For example, the DMS 310 may determine that a deletion event associated with deleting the snapshot 315-*a* is anomalous and may thus retain the snapshot 315-*a* beyond an expiration of the snapshot 315-*a*. Based on the deletion event being anomalous (e.g., in response to the determination, based on or in response to retaining the snapshot 315-*a*), the DMS 310 may output a retention indication 335. The retention indication 335 may indicate that the snapshot 315-*a* has been retained by the DMS 310. The DMS 310 may output (e.g., transmit) the retention indication 335 to the computing system 305 (e.g., or another computing system accessible to a user of the computing system 305) to notify the user of the computing system 305 of the retention of the snapshot 315-*a*.

In some examples, the retention indication 335 may be displayed at a user view 320 of the computing system 305 (e.g., a user view of the other computing system accessible to the user). For example, the user view 320 may be a user interface (e.g., a graphical user interface GUI) accessible (e.g., visible) to the user that includes one or more snapshot indications 330 (e.g., a snapshot indication 330-*a* through a snapshot indication 330-*m*). The snapshot indications 330 may include information associated with the snapshots 315 stored by the DMS 310. For example, the snapshot indication 330-*a* may correspond to the snapshot 315-*a* and may include an identifier S1 of the snapshot 315-*a*, a time that the snapshot 315-*a* was generated, data captured by the snapshot 315-*a*, an expiration date of the snapshot 315-*a*, or a combination thereof, among other information (e.g., metadata) associated with the snapshot 315-*a* that may be indicated by the snapshot indication 330-*a*. In some examples, the retention indication 335 (e.g., a message M1 included in the retention indication 335 or generated in response to the retention indication 335) may be included in the snapshot indication 330-*a*. For example, based on the output of the retention indication 335, the message M1, such as a message stating, "Snapshot retained beyond expiration date due to suspicious activity," may be included in (e.g., added to) the snapshot indication 330-*a* for display at the user view 320. Other messages for display are possible. Accordingly, the user of the computing system 305 may be notified of the retention of the snapshot 315-*a* beyond expiration.

In some examples, the user may evaluate whether the attempted deletion of the snapshot 315-*a* was intentional or unwanted. If the user determines that the attempted deletion was intentional, a verification procedure may be performed to delete the snapshot 315-*a*, for example, before an expiration of a retention duration of the snapshot 315-*a*. For example, the DMS 310 verify that the deletion event associated with the snapshot 315-*a* was intended based on a multiple-party verification procedure. For instance, multiple parties may verify (e.g., authorize) that the deletion event was intended, and the DMS 310 may delete the snapshot 315-*a* in response to the verification. The deletion of the retained snapshot 315-*a* may occur before the expiration of the retention duration such that storage space may be made available at a storage entity used to store the snapshot 315-*a*. In an example, a user may contact an operator of the DMS 310 (e.g., support staff associated with the DMS 310) and verify that the deletion event was intended. The operator may verify the identity of the user and authorize the request to delete the snapshot 315-*a* before the expiration of the retention duration based on verifying the identity of the user.

The DMS 310 may generate a data structure 325 accessible by the user of the computing system 305 that includes respective indications 340 of snapshots 315 retained by the DMS 310 beyond expiration. For example, to provide visibility to the user of the computing system as to which snapshots 315 have been retained by the DMS 310, the DMS 310 may generate the data structure 325. In the example of FIG. 3, if the snapshots 315-*a* through 315-*n* are retained by the DMS 310 beyond expiration, the DMS 310 may generate the data structure 325 to include an indication 340-*a* corresponding to the snapshot 315-*a*, an indication 340-*b* corresponding to the snapshot 315-*b*, and so on up through an indication 340-*n* corresponding to the snapshot 315-*n*. The indications 340 may include identifiers S corresponding to the respective snapshots 315. For example, the indication 340-*a* may include an identifier S1 corresponding to the snapshot 315-*a*, the indication 340-*b* may include an identifier S2 corresponding to the snapshot 315-*b*, and so on up through the indication 340-*n* including an identifier Sn corresponding to the snapshot 315-*n*.

The DMS 310 may output a message 345 that includes the data structure 325 for display at the computing system 305 (e.g., the other computing system accessible to the user). For example, the message 345 may be used to display the data structure 325 at a user interface (e.g., GUI) accessible to the user of the computing system 305. In some examples, the DMS 310 may output the message 345 in response to a request from the user to access (e.g., view) the data structure 325. In some examples, the data structure 325 may be referred to as a recycle bin that tracks the snapshots 315 which have been retained by the DMS 310. As additional snapshots 315 are retained or as retained snapshots are deleted, the DMS 310 may update the data structure 325 accordingly. In some cases, the DMS 310 may transmit additional messages 345 that cause the data structure 325 (e.g., as displayed to the user) to be updated accordingly.

Figure 4:
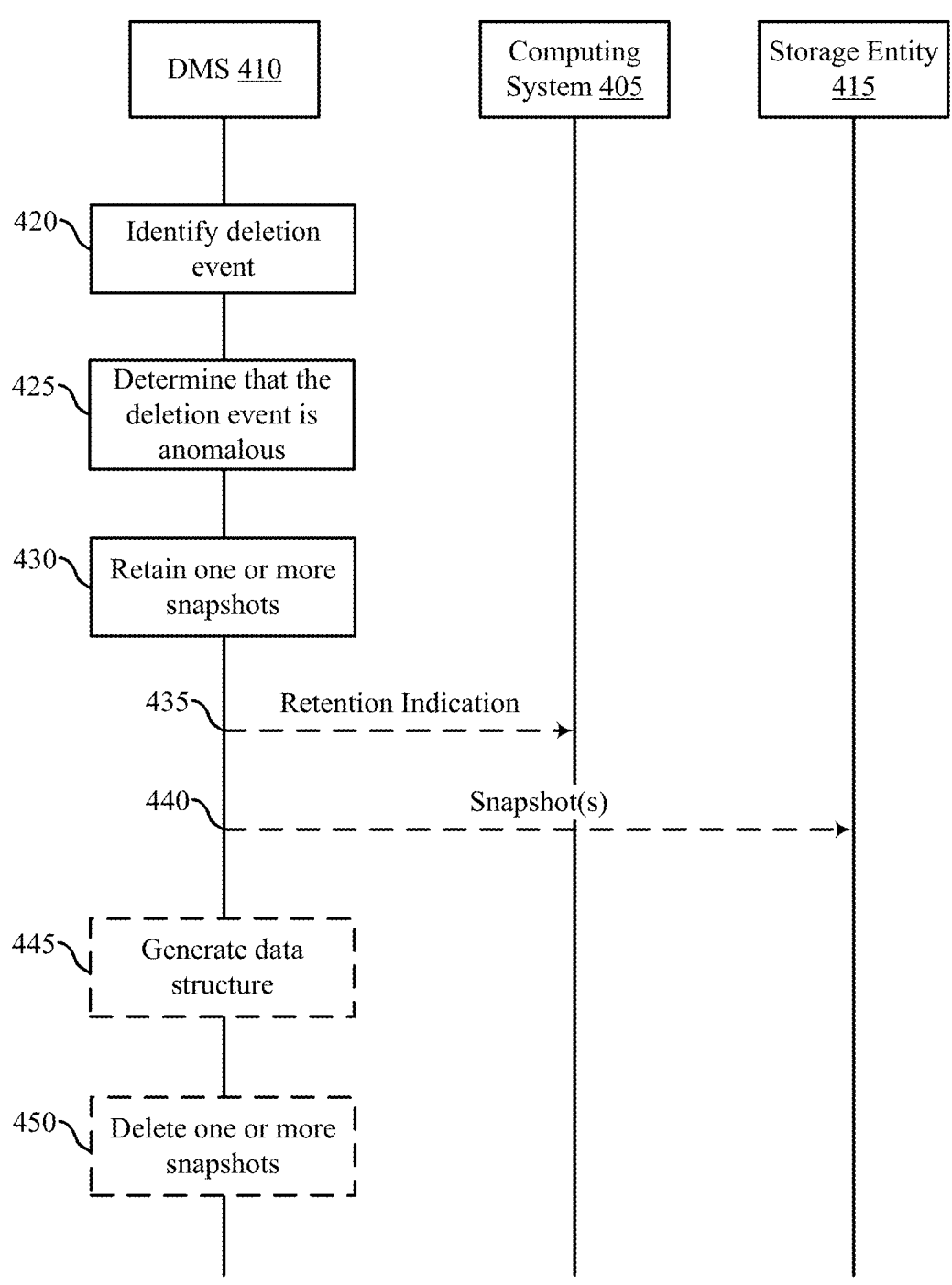
FIG. 4 illustrates an example of a process flow that supports intelligent protection of computing snapshots in accordance with aspects of the present disclosure.

FIG. 4 illustrates an example of a process flow 400 that supports intelligent protection of computing snapshots in accordance with aspects of the present disclosure. The process flow 400 may implement or be implemented by aspects of the computing environments described with reference to FIGS. 1 and 2. For example, the process flow 400 may be implemented by a computing system 405, a DMS 410, and a storage entity 415 to support the heuristic-based snapshot retention beyond expiration.

The computing system 405 and the DMS 410 may be examples of the corresponding systems described with reference to FIGS. 1 through 3. The storage entity 415 may be an example of a storage entity 215 described with reference to FIG. 2. In the following description of the process flow 400, the operations between the computing system 405, the DMS 410, and the storage entity 415 may be communicated in a different order than the example order shown, or the operations performed by the computing system 405, the DMS 410, and the storage entity 415 may be performed in different orders or at different times. Some operations may also be omitted from the process flow 400, and other operations may be added to the process flow 400. Further, although some operations or signaling may be shown to occur at different times for discussion purposes, these operations may actually occur at the same time.

At 420, the DMS 410 may identify a deletion event associated with one or more snapshots of the computing system 405 (e.g., one or more snapshots stored at the DMS 410). The deletion event may correspond to a deletion of the one or more snapshots at a first time. For example, the first time may correspond to an expiration of the one or more snapshots, in response to which the DMS 410 may delete the one or more snapshots.

At 425, the DMS 410 may determine that the deletion event is anomalous. For example, the DMS 410 may analyze one or more parameters associated with the deletion to determine that the deletion event is anomalous. For instance, the DMS 410 may determine that: the one or more snapshots were generated within a first threshold period of time before the first time; a retention period associated with the one or more snapshots was adjusted within a second threshold period of time before the first time; a quantity of the one or more snapshots satisfies a threshold quantity; or any combination thereof, which may indicate that the deletion event is anomalous.

At 430, the DMS 410 may retain the one or more snapshots beyond the first time. For example, the DMS 410 may retain (e.g., refrain from deleting) the one or more snapshots until at least a second time after the first time in accordance with a retention duration.

At 435, the DMS 410 may output a retention indication to the computing system 405. The retention indication may indicate that the one or more snapshots have been retained beyond the first time. In some examples, the retention indication may include a message for display at a user view accessible by a user of the computing system that the one or more snapshots have been retained beyond the first time. In some cases, message may be generated at the computing system 405 in response to the retention indication. In some examples, the message may indicate a reason for which the one or more snapshots have been retained beyond expiration, such as "for suspicious activity," or "due to unusual SLA activity," among other examples.

At 440, the DMS 410 offload one or more of the retained snapshots to the storage entity 415. For example, the DMS 410 may store the one or more retained snapshots to the storage entity 415 (and in some cases, the DMS 410 may also delete the one or more retained snapshots from a storage entity in which the snapshots were previously stored). In some examples, the DMS 410 may store the one or more retained snapshots to the storage entity 415 after an expiration of the retention duration (e.g., to continue the retention of the snapshots at a different storage entity beyond the second time). In some examples, the DMS 410 may store the one or more snapshots to the storage entity 415 to retain one or more snapshots (e.g., at the first time).

At 445, the DMS 410 may generate a data structure that includes indications of the one or more retained snapshots. For example, the data structure may include identifiers of the snapshots that have been retained (e.g., and are currently being retained) by the DMS 410 beyond expiration. The data structure may be accessible (e.g., viewable) by the user of computing system 405 such that the user may determine which snapshots are currently being retained by the DMS 410.

At 450, the DMS 410 may delete the one or more retained snapshots. In some examples, the DMS 410 may delete the one or more retained snapshots based on an expiration of the retention duration. For example, the DMS 410 may be configured to retain the one or more snapshots until a second time in accordance with the retention duration, and the DMS 410 may delete the one or more snapshots at the second time. In some examples, the DMS 410 may delete the one or more retained snapshots before an expiration of the retention duration. For example, if the DMS 410 verifies that the deletion event was intended (e.g., non-anomalous), for example, via a multiple-party verification procedure, the DMS 410 may delete the one or more retained snapshots before the second time.

Figure 5:
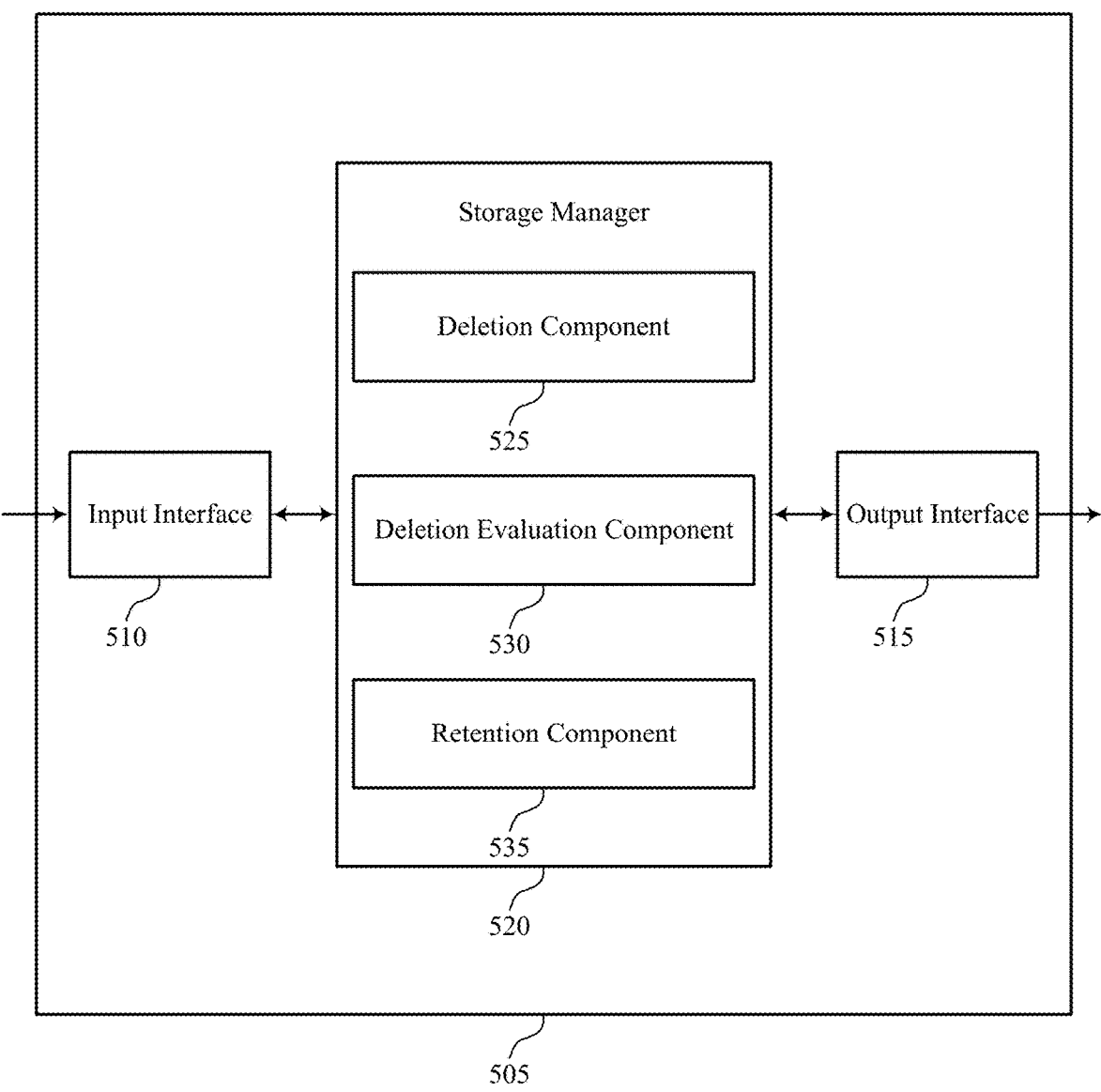
FIG. 5 shows a block diagram of an apparatus that supports intelligent protection of computing snapshots in accordance with aspects of the present disclosure.

FIG. 5 shows a block diagram 500 of a system 505 that supports intelligent protection of computing snapshots in accordance with aspects of the present disclosure. In some examples, the system 505 may be an example of aspects of one or more components described with reference to FIG. 1, such as a DMS 110. The system 505 may include an input interface 510, an output interface 515, and a storage manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the storage manager 520 to support storage tiering for computing system snapshots. In some cases, the input interface 510 may be a component of a network interface 715 as described with reference to FIG. 7.

The output interface 515 may manage output signaling for the system 505. For example, the output interface 515 may receive signaling from other components of the system 505, such as the storage manager 520, and may transmit such output signaling corresponding to (e.g., representative of or otherwise based on) such signaling to other systems or devices. In some cases, the output interface 515 may be a component of a network interface 715 as described with reference to FIG. 7.

The storage manager 520 may include a deletion component 525, a deletion evaluation component 530, a retention component 535, or any combination thereof. In some examples, the storage manager 520, or various components thereof, may be configured to perform various operations (e.g., receiving, monitoring, transmitting) using or otherwise in cooperation with the input interface 510, the output interface 515, or both. For example, the storage manager 520 may receive information from the input interface 510, send information to the output interface 515, or be integrated in combination with the input interface 510, the output interface 515, or both to receive information, transmit information, or perform various other operations as described herein.

The storage manager 520 may support data management in accordance with examples as disclosed herein. The deletion component 525 may be configured as or otherwise support a means for identifying, by a DMS, a deletion event associated with one or more snapshots of a computing system that is backed up by the DMS, where the deletion event is associated with the one or more snapshots being deleted at a first time. The deletion evaluation component 530 may be configured as or otherwise support a means for determining, by the DMS, that one or more parameter values associated with the deletion event are indicative of the deletion event being anomalous. The retention component 535 may be configured as or otherwise support a means for retaining, by the DMS in response to determining that the one or more parameter values are indicative of the deletion event being anomalous, the one or more snapshots until at least a second time after the first time associated with the deletion event.

Figure 6:
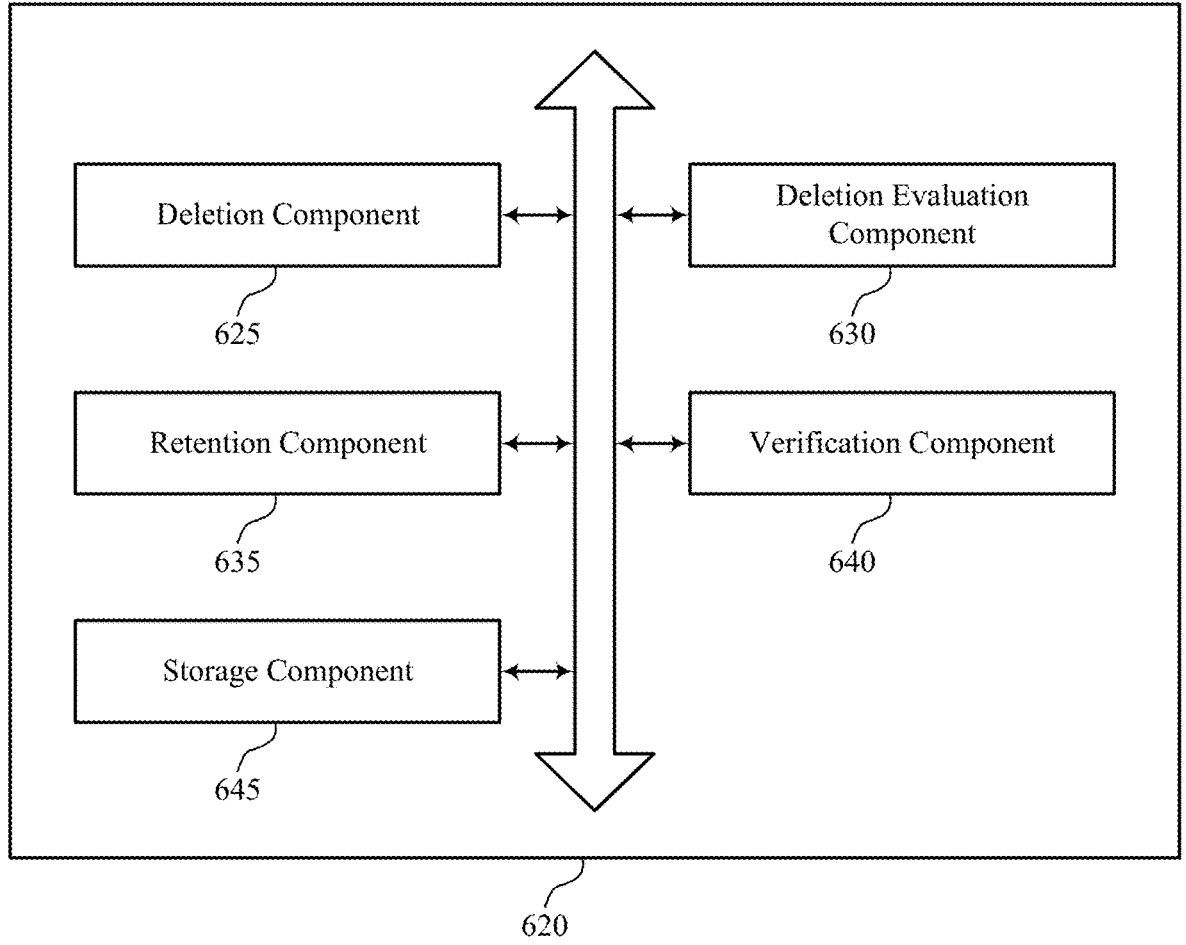
FIG. 6 shows a block diagram of a storage manager that supports intelligent protection of computing snapshots in accordance with aspects of the present disclosure.

FIG. 6 shows a block diagram 600 of a storage manager 620 that supports intelligent protection of computing snapshots in accordance with aspects of the present disclosure. The storage manager 620 may be an example of aspects of a storage manager 520 as described herein. The storage manager 620, or various components thereof, may be an example of means for performing various aspects of intelligent protection of computing snapshots as described herein. For example, the storage manager 620 may include a deletion component 625, a deletion evaluation component 630, a retention component 635, a verification component 640, a storage component 645, or any combination thereof. Each of these components may communicate, directly or indirectly, with one another (e.g., via one or more buses, communications links, communications interfaces, or any combination thereof).

The storage manager 620 may support data management in accordance with examples as disclosed herein. The deletion component 625 may be configured as or otherwise support a means for identifying, by a DMS, a deletion event associated with one or more snapshots of a computing system that is backed up by the DMS, where the deletion event is associated with the one or more snapshots being deleted at a first time. The deletion evaluation component 630 may be configured as or otherwise support a means for determining, by the DMS, that one or more parameter values associated with the deletion event are indicative of the deletion event being anomalous. The retention component 635 may be configured as or otherwise support a means for retaining, by the DMS in response to determining that the one or more parameter values are indicative of the deletion event being anomalous, the one or more snapshots until at least a second time after the first time associated with the deletion event.

In some examples, to support determining that the one or more parameter values are indicative of the deletion event being anomalous, the deletion evaluation component 630 may be configured as or otherwise support a means for determining that the one or more snapshots were generated within a threshold period of time before the first time.

In some examples, to support determining that the one or more parameter values are indicative of the deletion event being anomalous, the deletion evaluation component 630 may be configured as or otherwise support a means for determining that a retention period associated with the one or more snapshots was adjusted within a threshold period of time before the first time, the retention period corresponding to a time at which the one or more snapshots are eligible for deletion by the DMS.

In some examples, to support determining that the retention period was adjusted, the deletion evaluation component 630 may be configured as or otherwise support a means for determining that an SLA associated with the computing system and including a configuration of the retention period was adjusted within the threshold period of time.

In some examples, to support determining that the one or more parameter values are indicative of the deletion event being anomalous, the deletion evaluation component 630 may be configured as or otherwise support a means for determining that a quantity of the one or more snapshots satisfies a threshold quantity.

In some examples, one or more thresholds associated with the one or more parameter values and used to determine that the deletion event is anomalous may be based on a capacity of a storage entity used to store the one or more snapshots.

In some examples, the retention component 635 may be configured as or otherwise support a means for outputting, by the DMS, an indication that the one or more snapshots have been retained beyond the first time based on the deletion event being anomalous.

In some examples, the retention component 635 may be configured as or otherwise support a means for retaining, by the DMS, one or more second snapshots of the computing system beyond a third time associated with a second deletion event in response to one or more second parameter values associated with the second deletion event being indicative of the second deletion event being anomalous. In some examples, the verification component 640 may be configured as or otherwise support a means for verifying, by the DMS, that the second deletion event was intended to occur based on a multiple-party verification procedure. In some examples, the deletion component 625 may be configured as or otherwise support a means for deleting, by the DMS in response to the verification, the one or more second snapshots before an expiration of a retention period associated with the retention of the one or more second snapshots.

In some examples, the one or more snapshots may be stored in a first storage entity at the first time, and the storage component 645 may be configured as or otherwise support a means for storing the one or more retained snapshots in a second storage entity different from the first storage entity, the second storage entity associated with a greater access latency than the first storage entity. In some examples, the one or more snapshots are stored in the first storage entity at the first time, and the deletion component 625 may be configured as or otherwise support a means for deleting the one or more retained snapshots from the first storage entity.

In some examples, the one or more retained snapshots may be stored in the second storage entity after the second time.

In some examples, retaining the one or more snapshots until at least the second time may be based on a subscription associated with the computing system. In some examples, the one or more retained snapshots may be stored in the second storage entity based on a tier of the subscription.

In some examples, the retention component 635 may be configured as or otherwise support a means for generating, by the DMS, a data structure accessible by a user of the computing system that includes respective indications of the one or more snapshots retained by the DMS.

In some examples, a duration for which the one or more snapshots are retained may be based on a capacity of a storage entity used to retain the one or more snapshots, and the one or more snapshots may be retained until at least the second time in accordance with the duration.

In some examples, retaining the one or more snapshots until at least the second time may be based on a subscription associated with the computing system. In some examples, a duration for which the one or more snapshots are retained is based on a tier of the subscription.

In some examples, retaining the one or more snapshots until at least the second time in response to determining that the one or more parameter values are indicative of the deletion event being anomalous may be based on an immutable configuration of the DMS.

Figure 7:
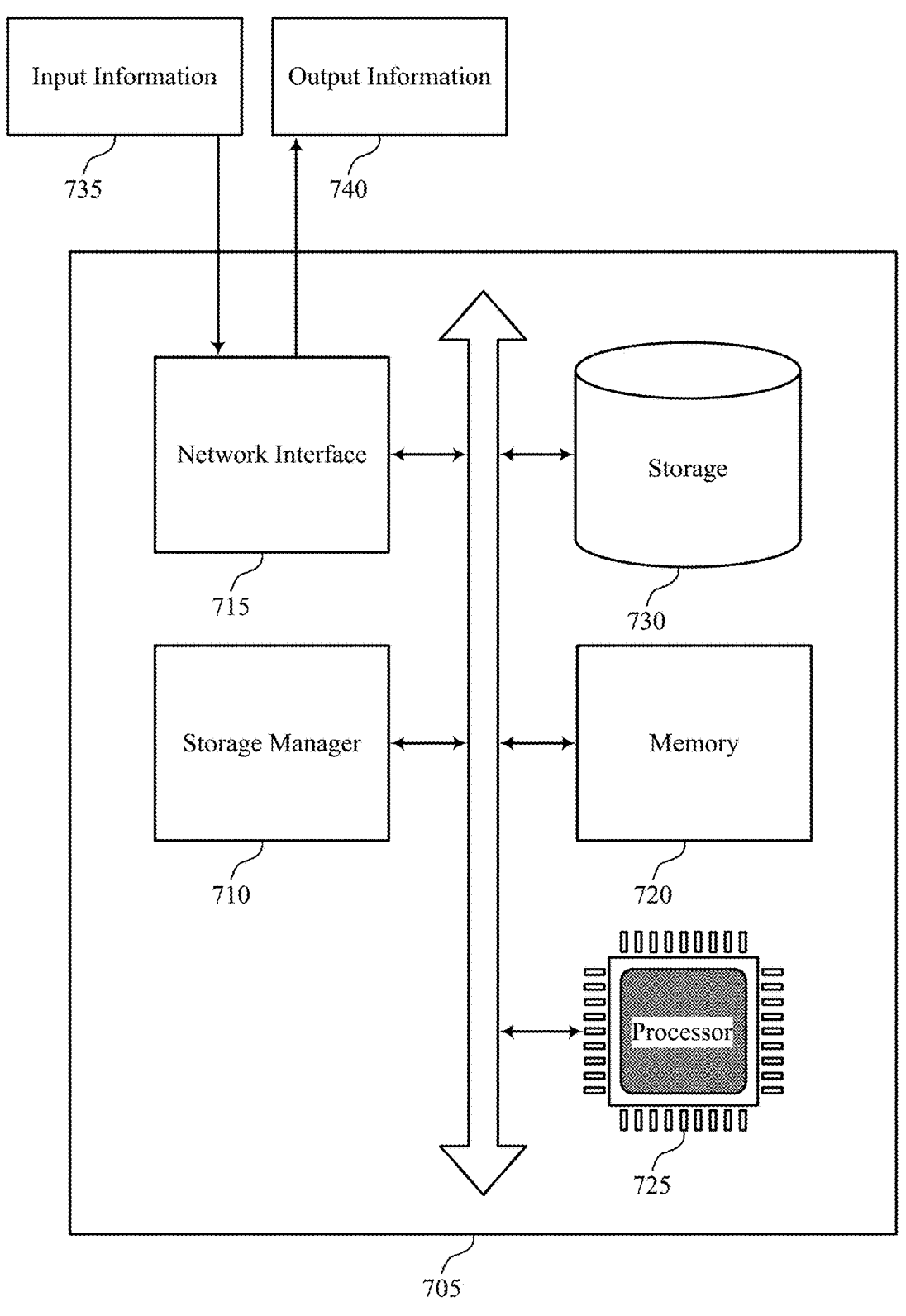
FIG. 7 shows a diagram of a system including a device that supports intelligent protection of computing snapshots in accordance with aspects of the present disclosure.

FIG. 7 shows a diagram of a system 700 including a system 705 that supports intelligent protection of computing snapshots in accordance with aspects of the present disclosure. The system 705 may be an example of or include the components of a system 505 as described herein. The system 705 may include components for data management, including components such as a storage manager 710, a network interface 715, a memory 720, a processor 725, and storage 730. These components may be in electronic communication or otherwise coupled with each other (e.g., operatively, communicatively, functionally, electronically, electrically; via one or more buses, communications links, communications interfaces, or any combination thereof). Additionally, the components of the system 705 may comprise corresponding physical components or may be implemented as corresponding virtual components (e.g., components of one or more virtual machines). In some examples, the system

705 may be an example of aspects of one or more components described with reference to FIG. 1, such as a DMS 110.

The network interface 715 may enable the system 705 to exchange information (e.g., input information 735, output information 740, or both) with other systems or devices (not shown). For example, the network interface 715 may enable the system 705 to connect to a network (e.g., a network 120 as described herein). The network interface 715 may include one or more wireless network interfaces, one or more wired network interfaces, or any combination thereof. In some examples, the network interface 715 may be an example of may be an example of aspects of one or more components described with reference to FIG. 1, such as one or more network interfaces 165.

Memory 720 may include RAM, ROM, or both. The memory 720 may store computer-readable, computer-executable software including instructions that, when executed, cause the processor 725 to perform various functions described herein. In some cases, the memory 720 may contain, among other things, a basic input/output system (BIOS), which may control basic hardware or software operation such as the interaction with peripheral components or devices. In some cases, the memory 720 may be an example of aspects of one or more components described with reference to FIG. 1, such as one or more memories 175.

The processor 725 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 725 may be configured to execute computer-readable instructions stored in a memory 720 to perform various functions (e.g., functions or tasks supporting storage tiering for computing system snapshots). Though a single processor 725 is depicted in the example of FIG. 7, it is to be understood that the system 705 may include any quantity of one or more of processors 725 and that a group of processors 725 may collectively perform one or more functions ascribed herein to a processor, such as the processor 725. In some cases, the processor 725 may be an example of aspects of one or more components described with reference to FIG. 1, such as one or more processors 170.

Storage 730 may be configured to store data that is generated, processed, stored, or otherwise used by the system 705. In some cases, the storage 730 may include one or more HDDs, one or more SDDs, or both. In some examples, the storage 730 may be an example of a single database, a distributed database, multiple distributed databases, a data store, a data lake, or an emergency backup database. In some examples, the storage 730 may be an example of one or more components described with reference to FIG. 1, such as one or more network disks 180.

The storage manager 710 may support data management in accordance with examples as disclosed herein. For example, the storage manager 710 may be configured as or otherwise support a means for identifying, by a DMS, a deletion event associated with one or more snapshots of a computing system that is backed up by the DMS, where the deletion event is associated with the one or more snapshots being deleted at a first time. The storage manager 710 may be configured as or otherwise support a means for determining, by the DMS, that one or more parameter values associated with the deletion event are indicative of the deletion event being anomalous. The storage manager 710 may be configured as or otherwise support a means for retaining, by the DMS in response to determining that the one or more parameter values are indicative of the deletion event being anomalous, the one or more snapshots until at least a second time after the first time associated with the deletion event.

By including or configuring the storage manager 710 in accordance with examples as described herein, the system 705 may support techniques for increased snapshot protection and security, prevention or reduction of anomalous snapshot deletion, improved snapshot recovery (e.g., due to retention of snapshots that would otherwise be deleted), increased protection from ransomware attacks, reduction in adverse effects associated with ransomware attacks, and improved user experience related to improved snapshot protection and recovery, among other benefits.

FIG. 8 shows a flowchart illustrating a method 800 that supports intelligent protection of computing snapshots in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include identifying, by a DMS, a deletion event associated with one or more snapshots of a computing system that is backed up by the DMS, where the deletion event is associated with the one or more snapshots being deleted at a first time. The operations of 805 may be performed in accordance with examples as disclosed herein. In some examples, aspects of the operations of 805 may be performed by a deletion component 625 as described with reference to FIG. 6.

At 810, the method may include determining, by the DMS, that one or more parameter values associated with the deletion event are indicative of the deletion event being anomalous. The operations of 810 may be performed in accordance with examples as disclosed herein. In some examples, aspects of the operations of 810 may be performed by a deletion evaluation component 630 as described with reference to FIG. 6.

At 815, the method may include retaining, by the DMS in response to determining that the one or more parameter values are indicative of the deletion event being anomalous, the one or more snapshots until at least a second time after the first time associated with the deletion event. The operations of 815 may be performed in accordance with examples as disclosed herein. In some examples, aspects of the operations of 815 may be performed by a retention component 635 as described with reference to FIG. 6.

FIG. 9 shows a flowchart illustrating a method 900 that supports intelligent protection of computing snapshots in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include identifying, by a DMS, a deletion event associated with one or more snapshots of a computing system that is backed up by the DMS, where the deletion event is associated with the one or more snapshots being deleted at a first time. The operations of 905 may be performed in accordance with examples as disclosed herein. In some examples, aspects of the operations of 905 may be performed by a deletion component 625 as described with reference to FIG. 6.

At 910, the method may include determining, by the DMS, that one or more parameter values associated with the deletion event are indicative of the deletion event being anomalous. In some examples, determining that the one or more parameter values are indicative of the deletion event being anomalous may include determining that the one or more snapshots were generated within a threshold period of time before the first time. The operations of 910 may be performed in accordance with examples as disclosed herein. In some examples, aspects of the operations of 910 may be performed by a deletion evaluation component 630 as described with reference to FIG. 6.

At 915, the method may include retaining, by the DMS in response to determining that the one or more parameter values are indicative of the deletion event being anomalous, the one or more snapshots until at least a second time after the first time associated with the deletion event. The operations of 915 may be performed in accordance with examples as disclosed herein. In some examples, aspects of the operations of 915 may be performed by a retention component 635 as described with reference to FIG. 6.

FIG. 10 shows a flowchart illustrating a method 1000 that supports intelligent protection of computing snapshots in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include identifying, by a DMS, a deletion event associated with one or more snapshots of a computing system that is backed up by the DMS, where the deletion event is associated with the one or more snapshots being deleted at a first time. The operations of 1005 may be performed in accordance with examples as disclosed herein. In some examples, aspects of the operations of 1005 may be performed by a deletion component 625 as described with reference to FIG. 6.

At 1010, the method may include determining, by the DMS, that one or more parameter values associated with the deletion event are indicative of the deletion event being anomalous. In some examples, determining that the one or more parameter values are indicative of the deletion event being anomalous may include determining that a retention period associated with the one or more snapshots was adjusted within a threshold period of time before the first time, the retention period corresponding to a time at which the one or more snapshots are eligible for deletion by the DMS. The operations of 1010 may be performed in accordance with examples as disclosed herein. In some examples, aspects of the operations of 1010 may be performed by a deletion evaluation component 630 as described with reference to FIG. 6.

At 1015, the method may include retaining, by the DMS in response to determining that the one or more parameter values are indicative of the deletion event being anomalous, the one or more snapshots until at least a second time after the first time associated with the deletion event. The operations of 1015 may be performed in accordance with examples as disclosed herein. In some examples, aspects of the operations of 1015 may be performed by a retention component 635 as described with reference to FIG. 6.

FIG. 11 shows a flowchart illustrating a method 1100 that supports intelligent protection of computing snapshots in accordance with aspects of the present disclosure. The operations of the method 1100 may be implemented by a DMS or its components as described herein. For example, the operations of the method 1100 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include identifying, by a DMS, a deletion event associated with one or more snapshots of a computing system that is backed up by the DMS, where the deletion event is associated with the one or more snapshots being deleted at a first time. The operations of 1105 may be performed in accordance with examples as disclosed herein. In some examples, aspects of the operations of 1105 may be performed by a deletion component 625 as described with reference to FIG. 6.

At 1110, the method may include determining, by the DMS, that one or more parameter values associated with the deletion event are indicative of the deletion event being anomalous. In some examples, determining that the one or more parameter values are indicative of the deletion event being anomalous may include determining that a quantity of the one or more snapshots satisfies a threshold quantity. The operations of 1110 may be performed in accordance with examples as disclosed herein. In some examples, aspects of the operations of 1110 may be performed by a deletion evaluation component 630 as described with reference to FIG. 6.

At 1115, the method may include retaining, by the DMS in response to determining that the one or more parameter values are indicative of the deletion event being anomalous, the one or more snapshots until at least a second time after the first time associated with the deletion event. The operations of 1115 may be performed in accordance with examples as disclosed herein. In some examples, aspects of the operations of 1115 may be performed by a retention component 635 as described with reference to FIG. 6.

A method for data management is described. The method may include identifying, by a DMS, a deletion event associated with one or more snapshots of a computing system that is backed up by the DMS, where the deletion event is associated with the one or more snapshots being deleted at a first time, determining, by the DMS, that one or more parameter values associated with the deletion event are indicative of the deletion event being anomalous, and retaining, by the DMS in response to determining that the one or more parameter values are indicative of the deletion event being anomalous, the one or more snapshots until at least a second time after the first time associated with the deletion event.

An apparatus for data management is described. The apparatus may include at least one processor, memory coupled with the at least one processor, and instructions stored in the memory. The instructions may be executable by the at least one processor to cause the apparatus to identify, by a DMS, a deletion event associated with one or more snapshots of a computing system that is backed up by the DMS, where the deletion event is associated with the one or more snapshots being deleted at a first time, determine, by the DMS, that one or more parameter values associated with the deletion event are indicative of the deletion event being anomalous, and retain, by the DMS in response to determining that the one or more parameter values are indicative of the deletion event being anomalous, the one or more snapshots until at least a second time after the first time associated with the deletion event.

Another apparatus for data management is described. The apparatus may include means for identifying, by a DMS, a deletion event associated with one or more snapshots of a computing system that is backed up by the DMS, where the deletion event is associated with the one or more snapshots being deleted at a first time, means for determining, by the DMS, that one or more parameter values associated with the deletion event are indicative of the deletion event being anomalous, and means for retaining, by the DMS in response to determining that the one or more parameter values are indicative of the deletion event being anomalous, the one or more snapshots until at least a second time after the first time associated with the deletion event.

A non-transitory computer-readable medium storing code for data management is described. The code may include instructions executable by a processor to identify, by a DMS, a deletion event associated with one or more snapshots of a computing system that is backed up by the DMS, where the deletion event is associated with the one or more snapshots being deleted at a first time, determine, by the DMS, that one or more parameter values associated with the deletion event are indicative of the deletion event being anomalous, and retain, by the DMS in response to determining that the one or more parameter values are indicative of the deletion event being anomalous, the one or more snapshots until at least a second time after the first time associated with the deletion event.

In some examples of the method, apparatuses, and non-transitory computer-readable medium described herein, operations, features, means, or instructions for determining that the one or more parameter values may be indicative of the deletion event being anomalous may include operations, features, means, or instructions for determining that the one or more snapshots were generated within a threshold period of time before the first time.

In some examples of the method, apparatuses, and non-transitory computer-readable medium described herein, operations, features, means, or instructions for determining that the one or more parameter values may be indicative of the deletion event being anomalous may include operations, features, means, or instructions for determining that a retention period associated with the one or more snapshots was adjusted within a threshold period of time before the first time, the retention period corresponding to a time at which the one or more snapshots may be eligible for deletion by the DMS.

In some examples of the method, apparatuses, and non-transitory computer-readable medium described herein, operations, features, means, or instructions for determining that the retention period was adjusted may include operations, features, means, or instructions for determining that an SLA associated with the computing system and including a configuration of the retention period was adjusted within the threshold period of time.

In some examples of the method, apparatuses, and non-transitory computer-readable medium described herein, operations, features, means, or instructions for determining that the one or more parameter values may be indicative of the deletion event being anomalous may include operations, features, means, or instructions for determining that a quantity of the one or more snapshots satisfies a threshold quantity.

In some examples of the method, apparatuses, and non-transitory computer-readable medium described herein, one or more thresholds associated with the one or more parameter values and used to determine that the deletion event is anomalous may be based on a capacity of a storage entity used to store the one or more snapshots.

Some examples of the method, apparatuses, and non-transitory computer-readable medium described herein may further include operations, features, means, or instructions for outputting, by the DMS, an indication that the one or more snapshots may have been retained beyond the first time based on the deletion event being anomalous.

Some examples of the method, apparatuses, and non-transitory computer-readable medium described herein may further include operations, features, means, or instructions for retaining, by the DMS, one or more second snapshots of the computing system beyond a third time associated with a second deletion event in response to one or more second parameter values associated with the second deletion event being indicative of the second deletion event being anomalous, verifying, by the DMS, that the second deletion event was intended to occur based on a multiple-party verification procedure, and deleting, by the DMS in response to the verification, the one or more second snapshots before an expiration of a retention period associated with the retention of the one or more second snapshots.

In some examples of the method, apparatuses, and non-transitory computer-readable medium described herein, the one or more snapshots may be stored in a first storage entity at the first time, and the method, apparatuses, and non-transitory computer-readable medium may include further operations, features, means, or instructions for storing the one or more retained snapshots in a second storage entity different from the first storage entity, the second storage entity associated with a greater access latency than the first storage entity, and deleting the one or more retained snapshots from the first storage entity.

In some examples of the method, apparatuses, and non-transitory computer-readable medium described herein, the one or more retained snapshots may be stored in the second storage entity after the second time.

In some examples of the method, apparatuses, and non-transitory computer-readable medium described herein, operations, features, means, or instructions for retaining the one or more snapshots until at least the second time may be based on a subscription associated with the computing system and the one or more retained snapshots may be stored in the second storage entity based on a tier of the subscription.

Some examples of the method, apparatuses, and non-transitory computer-readable medium described herein may further include operations, features, means, or instructions for generating, by the DMS, a data structure accessible by a user of the computing system that includes respective indications of the one or more snapshots retained by the DMS.

In some examples of the method, apparatuses, and non-transitory computer-readable medium described herein, a duration for which the one or more snapshots may be retained may be based on a capacity of a storage entity used to retain the one or more snapshots, the one or more snapshots retained until at least the second time in accordance with the duration.

In some examples of the method, apparatuses, and non-transitory computer-readable medium described herein, operations, features, means, or instructions for retaining the one or more snapshots until at least the second time may be based on a subscription associated with the computing system and a duration for which the one or more snapshots may be retained may be based on a tier of the subscription.

In some examples of the method, apparatuses, and non-transitory computer-readable medium described herein, operations, features, means, or instructions for retaining the one or more snapshots until at least the second time in response to determining that the one or more parameter values are indicative of the deletion event being anomalous may be based on an immutable configuration of the DMS.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving a request to change a first retention policy for retaining a plurality of snapshots of a computing system to a second retention policy for retaining the plurality of snapshots of the computing system, wherein:
under the second retention policy, one or more snapshots of the plurality of snapshots of the computing system expire within a duration after changing the first retention policy to the second retention policy; and
under the first retention policy, the one or more snapshots of the computing system would be nonexpired within the duration;
changing from the first retention policy to the second retention policy based at least in part on receiving the request; and
outputting, based at least in part on changing the first retention policy to the second retention policy, an indication that the one or more snapshots of the plurality of snapshots for the computing system are being retained despite being expired under the second retention policy, wherein the indication is based at least in part on one or more parameters associated with an expiration of the one or more snapshots being indicative of the expiration of the one or more snapshots being anomalous.

2. The method of claim 1, further comprising:
verifying, based at least in part on outputting the indication that the one or more snapshots for the computing system are being retained, whether the expiration of the one or more snapshots was non-anomalous based at least in part on a multiple-party verification procedure; and
deleting, in response to verifying the expiration of the one or more snapshots was non-anomalous, the one or more snapshots.

3. The method of claim 1, further comprising:
identifying, based at least in part on changing the first retention policy to the second retention policy, a deletion event associated with the one or more snapshots of the computing system as a result of the one or more snapshots being expired under the second retention policy.

4. The method of claim 3, further comprising:
retaining, despite the deletion event occurring for the one or more snapshots, the one or more snapshots based at least in part on the one or more snapshots expiring within the duration after changing the first retention policy to the second retention policy.

5. The method of claim 3, further comprising:
determining, based at least in part on identifying the deletion event associated with the one or more snapshots of the computing system, that the one or more parameters associated with the deletion event are indicative of the deletion event being anomalous.

6. The method of claim 5, wherein determining that the one or more parameters associated with the deletion event are indicative of the deletion event being anomalous comprises:
determining that the one or more snapshots were generated within a threshold duration after the request to change the first retention policy to the second retention policy.

7. The method of claim 5, wherein determining that the one or more parameters associated with the deletion event are indicative of the deletion event being anomalous comprises:
determining that a quantity of the one or more snapshots satisfies a threshold quantity.

8. The method of claim 5, wherein a determination that the deletion event is anomalous is based at least in part on a capacity of a storage entity used to store the one or more snapshots.

9. The method of claim 5, further comprising:

retaining, in response to determining that the one or more parameters associated with the deletion event are indicative of the deletion event being anomalous, the one or more snapshots for a second duration.

10. The method of claim 1, further comprising:

storing the one or more retained snapshots in a second storage entity that is different than a first storage entity used to store the one or more snapshots, the second storage entity being associated with a greater access latency than the first storage entity; and deleting the one or more retained snapshots from the first storage entity.

11. The method of claim 1, further comprising:

generating a data structure accessible by a user of the computing system that includes respective indications of the one or more retained snapshots.

12. A data management system, comprising:

one or more processors; and one or more memories storing instructions executable, individually or collectively, by the one or more processors to cause the data management system to:

receive a request to change a first retention policy for retaining a plurality of snapshots of a computing system to a second retention policy for retaining the plurality of snapshots of the computing system, wherein:

under the second retention policy, one or more snapshots of the plurality of snapshots of the computing system expire within a duration after changing the first retention policy to the second retention policy; and under the first retention policy, the one or more snapshots of the plurality of snapshots of the computing system would be nonexpired within the duration;

change, from the first retention policy to the second retention policy based at least in part on receiving the request; and output, based at least in part on changing the first retention policy to the second retention policy, an indication that the one or more snapshots of the plurality of snapshots for the computing system are being retained despite being expired under the second retention policy, wherein the indication is based at least in part on one or more parameters associated with an expiration of the one or more snapshots being indicative of the expiration of the one or more snapshots being anomalous.

13. The data management system of claim 12, wherein the instructions are executable, individually or collectively, by the one or more processors to cause the data management system to:

identify, based at least in part on changing the first retention policy to the second retention policy, a deletion event associated with the one or more snapshots of the computing system as a result of the one or more snapshots being expired under the second retention policy.

14. The data management system of claim 13, wherein the instructions are executable, individually or collectively, by the one or more processors to cause the data management system to:

retain, despite the deletion event occurring for the one or more snapshots, the one or more snapshots based at least in part on the one or more snapshots expiring within the duration after changing the first retention policy to the second retention policy.

15. The data management system of claim 13, wherein the instructions are executable, individually or collectively, by the one or more processors to cause the data management system to:

determine, based at least in part on identifying the deletion event associated with the one or more snapshots of the computing system, that the one or more parameters associated with the deletion event are indicative of the deletion event being anomalous.

16. The data management system of claim 12, wherein the instructions are executable, individually or collectively, by the one or more processors to cause the data management system to:

store the one or more retained snapshots in a second storage entity that is different than a first storage entity used to store the one or more snapshots, the second storage entity being associated with a greater access latency than the first storage entity; and delete the one or more retained snapshots from the first storage entity.

17. A non-transitory, computer-readable medium storing code that comprises instructions executable, individually or collectively, by one or more processors of a data management system to cause the data management system to:

receive a request to change a first retention policy for retaining a plurality of snapshots of a computing system to a second retention policy for retaining the plurality of snapshots of the computing system, wherein:

under the second retention policy, one or more snapshots of the plurality of snapshots of the computing system expire within a duration after changing the first retention policy to the second retention policy; and under the first retention policy, the one or more snapshots of the plurality of snapshots of the computing system would be nonexpired within the duration;

change, from the first retention policy to the second retention policy based at least in part on receiving the request; and output, based at least in part on changing the first retention policy to the second retention policy, an indication that the one or more snapshots of the plurality of snapshots for the computing system are being retained despite being expired under the second retention policy, wherein the indication is based at least in part on one or more parameters associated with an expiration of the one or more snapshots being indicative of the expiration of the one or more snapshots being anomalous.

* * * * *